(12) United States Patent
Lim et al.

(10) Patent No.: US 11,297,679 B2
(45) Date of Patent: Apr. 5, 2022

(54) METHOD AND APPARATUS FOR TRANSMITTING DATA OVER NCCB IN WIRELESS LAN SYSTEM

(71) Applicant: LG ELECTRONICS INC., Seoul (KR)

(72) Inventors: Dongguk Lim, Seoul (KR); Suhwook Kim, Seoul (KR); Kiseon Ryu, Seoul (KR); Eunsung Park, Seoul (KR); Jinsoo Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/040,491

(22) PCT Filed: Mar. 25, 2019

(86) PCT No.: PCT/KR2019/003442
§ 371 (c)(1),
(2) Date: Sep. 22, 2020

(87) PCT Pub. No.: WO2019/182427
PCT Pub. Date: Sep. 26, 2019

(65) Prior Publication Data
US 2021/0029774 A1 Jan. 28, 2021

(30) Foreign Application Priority Data
Mar. 23, 2018 (KR) .................. 10-2018-0034133

(51) Int. Cl.
*H04W 76/28* (2018.01)
*H04W 76/11* (2018.01)
(Continued)

(52) U.S. Cl.
CPC .......... *H04W 76/28* (2018.02); *H04B 7/0452* (2013.01); *H04W 8/24* (2013.01);
(Continued)

(58) Field of Classification Search
CPC ............... H04W 8/24; H04W 72/0453; H04W 74/0833; H04W 76/11; H04W 76/28; H04B 7/0452
(Continued)

(56) References Cited

U.S. PATENT DOCUMENTS

2014/0328430 A1* 11/2014 Park .................... H04L 27/2613
375/295
2015/0312910 A1* 10/2015 Damodaran .......... H04W 28/20
370/329
(Continued)

FOREIGN PATENT DOCUMENTS

WO 2016/167561 10/2016
WO 2017/069814 4/2017

OTHER PUBLICATIONS

PCT International Application No. PCT/KR2019/003442, International Search Report dated Jul. 2, 2019, 2 pages.
(Continued)

*Primary Examiner* — Congvan Tran
(74) *Attorney, Agent, or Firm* — Lee Hong Degerman Kang & Waimey

(57) ABSTRACT

Proposed are a method and an apparatus for transmitting data in a wireless LAN system. Particularly, an AP transmits a PPDU to one STA. The AP transmits data to the one STA over a first NCCB band or a second NCCB band on the basis of the PPDU. The PPDU includes a first signal field and a second signal field. The first NCCB band is a 40 MHz or 60 MHz band generated by bonding a discontinuous 20 MHz band in an 80 MHz band. The second NCCB band is an 80 MHz, 100 MHz, 120 MHz, or 140 MHz band generated by bonding a discontinuous 20 MHz band in a 160 MHz band. The first signal field includes first information and second information. The first information is NCCB indication information on whether or not an NCCB can be performed. The
(Continued)

second information is NCCB bandwidth information for a band to be used for transmitting the PPDU from the first NCCB band and the second NCCB band.

11 Claims, 22 Drawing Sheets

(51) Int. Cl.
H04B 7/0452 (2017.01)
H04W 8/24 (2009.01)
H04W 72/04 (2009.01)
H04W 74/08 (2009.01)
H04W 84/12 (2009.01)

(52) U.S. Cl.
CPC ... *H04W 72/0453* (2013.01); *H04W 74/0833* (2013.01); *H04W 76/11* (2018.02); *H04W 84/12* (2013.01)

(58) Field of Classification Search
USPC .................................................. 370/328, 329
See application file for complete search history.

(56) References Cited

U.S. PATENT DOCUMENTS

| 2016/0014725 | A1* | 1/2016 | Yu | H04W 72/0453 370/329 |
| 2017/0006608 | A1* | 1/2017 | Josiam | H04L 5/0023 |
| 2017/0181039 | A1* | 6/2017 | Adachi | H04W 28/20 |
| 2017/0273083 | A1 | 9/2017 | Chen et al. | |
| 2017/0280452 | A1* | 9/2017 | Choi | H04W 72/0453 |

OTHER PUBLICATIONS

Wilus et al., "Discussions for Non-contiguous Channel Bonding;" IEEE 802.11-16/0638r2, May 17, 2016, 16 pages.

Huawei, "BW indication for Non-contiguous Channel Bonding," IEEE 802.11-16/0635r2, May 17, 2016, 19 pages.

* cited by examiner

FIG. 1
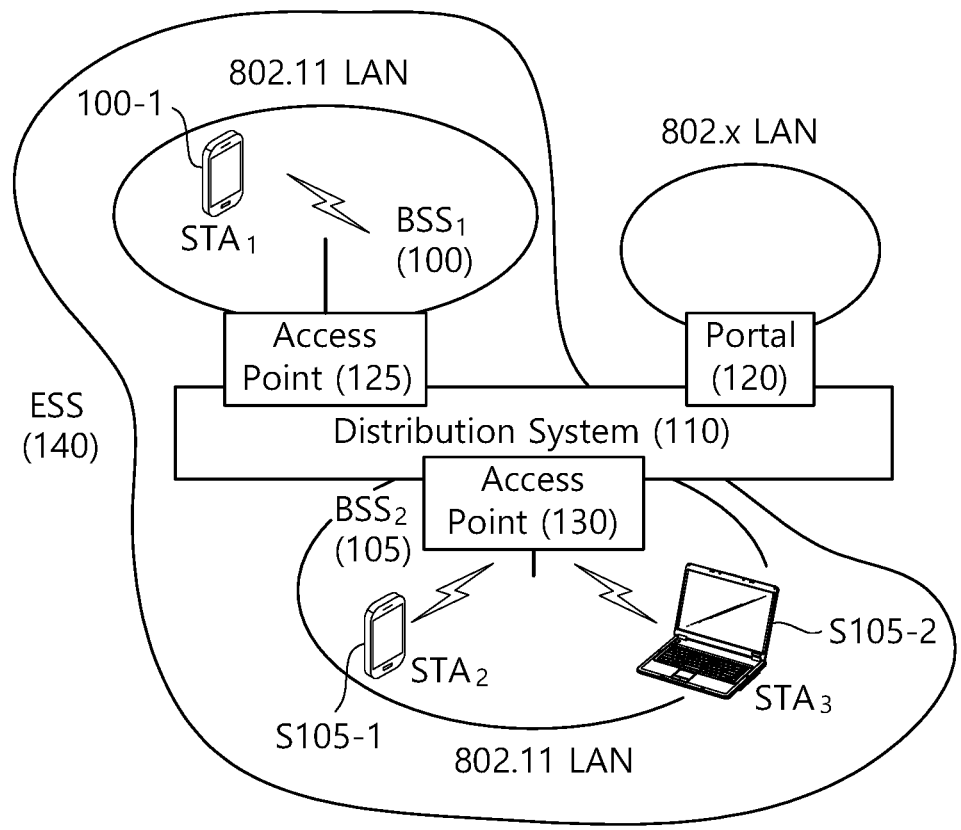
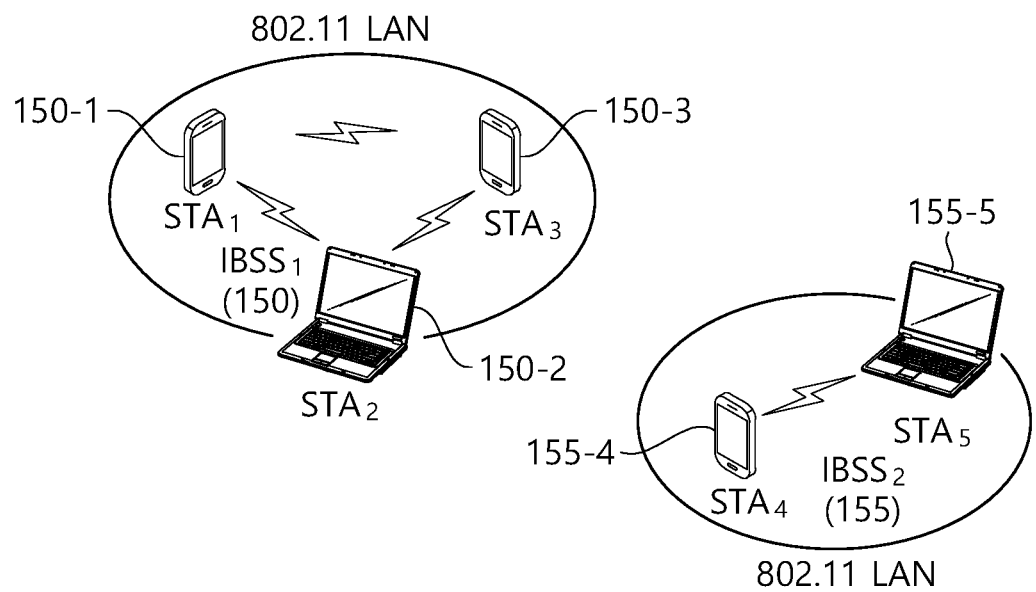

FIG. 15

| | B0 | B1 | B19 | B20 | B25 | ... | |
|---|---|---|---|---|---|---|---|
| | NCCB support | Channel width set | | Punctured preamble RX | | ... | ... |
| bits: | 1 | 20 | | 6 | | | |

METHOD AND APPARATUS FOR TRANSMITTING DATA OVER NCCB IN WIRELESS LAN SYSTEM

CROSS-REFERENCE TO RELATED APPLICATIONS

This application is the National Stage filing under 35 U.S.C. 371 of International Application No. PCT/KR2019/003442, filed on Mar. 25, 2019, which claims the benefit of earlier filing date and right of priority to Korean Application No. 10-2018-0034133, filed on Mar. 23, 2018, the contents of which are all hereby incorporated by reference herein in their entirety.

BACKGROUND OF THE DISCLOSURE

Field of the Disclosure

This specification relates to a scheme for performing NCCB in a wireless LAN system and, most particularly, to a method and device for transmitting data via NCCB in a wireless LAN system.

Related Art

Discussion for a next-generation wireless local area network (WLAN) is in progress. In the next-generation WLAN, an object is to 1) improve an institute of electronic and electronics engineers (IEEE) 802.11 physical (PHY) layer and a medium access control (MAC) layer in bands of 2.4 GHz and 5 GHz, 2) increase spectrum efficiency and area throughput, 3) improve performance in actual indoor and outdoor environments such as an environment in which an interference source exists, a dense heterogeneous network environment, and an environment in which a high user load exists, and the like.

An environment which is primarily considered in the next-generation WLAN is a dense environment in which access points (APs) and stations (STAs) are a lot and under the dense environment, improvement of the spectrum efficiency and the area throughput is discussed. Further, in the next-generation WLAN, in addition to the indoor environment, in the outdoor environment which is not considerably considered in the existing WLAN, substantial performance improvement is concerned.

In detail, scenarios such as wireless office, smart home, stadium, Hotspot, and building/apartment are largely concerned in the next-generation WLAN and discussion about improvement of system performance in a dense environment in which the APs and the STAs are a lot is performed based on the corresponding scenarios.

In the next-generation WLAN, improvement of system performance in an overlapping basic service set (OBSS) environment and improvement of outdoor environment performance, and cellular offloading are anticipated to be actively discussed rather than improvement of single link performance in one basic service set (BSS). Directionality of the next-generation means that the next-generation WLAN gradually has a technical scope similar to mobile communication. When a situation is considered, in which the mobile communication and the WLAN technology have been discussed in a small cell and a direct-to-direct (D2D) communication area in recent years, technical and business convergence of the next-generation WLAN and the mobile communication is predicted to be further active.

SUMMARY OF THE DISCLOSURE

Technical Objects

This specification proposes a method and device for transmitting data via NCCB in a wireless LAN system.

Technical Solutions

An example of this specification proposes a method for transmitting/receiving data via NCCB.

This embodiment may be performed in a network environment supporting a next generation wireless LAN system. The next generation wireless LAN system is an improved wireless LAN system version of the 802.11ax system being capable of satisfying backward compatibility with the 802.11ax system.

Firstly, the terms will be defined. HE MU PPDU, HE-SIG-A field (first signal field), and HE-SIG-B field (second signal field) may all be PPDU and fields that are defined in the 802.11ax system. The PPDU and fields included in the PPDU that will hereinafter be described in detail may all be PPDU and fields being defined for performing NCCB in a next generation wireless LAN system. However, the PPDU and fields being defined for performing NCCB may be generated by using each subfield of the HE PPDU without any modification in order to satisfy backward compatibility with the 802.11ax system.

This embodiment may be performed in a transmitting device, and the transmitting device may correspond to an access point (AP). A receiving device may correspond to a station (STA) (i.e., non-AP STA) having NCCB capability.

An access point (AP) transmits a Physical layer Protocol Data Unit (PPDU) to one station (STA).

Data is transmitted to the one STA through a first Non-Continuous Channel Bonding (NCCB) bandwidth or a second NCCB bandwidth based on the PPDU.

The PPDU is a PPDU being used for NCCB transmission, and, therefore, the PPDU may be an RTS frame, a trigger frame, an HE SU PPDU, or an HE MU PPDU. However, in the embodiment that will hereinafter be described in detail, the PPDU will be limited to an HE MU PPDU and described accordingly. In case the PPDU is an RTS frame, trigger frame, or HE SU PPDU, the PPDU may operate identically as the PPDU of the above-described embodiment. The RTS frame, trigger frame, HE SU PPDU, or HE MU PPDU may be modified or newly defined in a next generation wireless LAN (WLAN) system.

The PPDU includes a first signal field and a second signal field. As described above, the PPDU may be generated by using a High Efficiency Multi User PPDU (HE MU PPDU). The first signal field may be related to an HE-SIG-A field, which is included in the HE MU PPDU. And, the second signal field may be related to an HE-SIG-B field, which is included in the HE MU PPDU. Since the second signal field is included, it may be known that the PPDU is a PPDU format that is based on HE MU PPDU.

The first NCCB bandwidth is a 40 MHz or 60 MHz bandwidth, which is generated by bonding non-continuous 20 MHz bandwidths within an 80 MHz bandwidth. That is, in case a full (or total) bandwidth is 80 MHz, the first NCCB bandwidth may generate a 40 MHz bandwidth or a 60 MHz bandwidth by bonding non-continuous 20 MHz bandwidths. In case of generating a 60 MHz bandwidth, specific 20 MHz bandwidths may be adjacent to one another. In the 80 MHz bandwidth, the number of cases where 40 MHz and 60 MHz bandwidths are generated by using NCCB may be equal to a total of 5 cases.

The second NCCB bandwidth is an 80 MHz, 100 MHz, 120 MHz, or 140 MHz bandwidth, which is generated by bonding non-continuous 20 MHz bandwidths within a 160 MHz bandwidth. That is, in case a full (or total) bandwidth is 160 MHz, the second NCCB bandwidth may generate an 80 MHz, a 100 MHz bandwidth, a 120 MHz bandwidth, or a 140 MHz bandwidth by bonding non-continuous 20 MHz bandwidths. In the 160 MHz bandwidth, the number of cases where 80 MHz, 100 MHz, 120 MHz, and 140 MHz bandwidths are generated by using NCCB may be equal to a total of 64 cases.

The first signal field includes first information and second information.

The first information is NCCB indication information on whether or not NCCB can be performed. For example, if the NCCB transmission can be performed, the NCCB indication information may be set to 1, and, if simply an MU transmission of 802.11ax can be performed, the NCCB indication information may be set to 0.

The second information is an NCCB bandwidth information for one bandwidth of the first NCCB bandwidth and the second NCCB bandwidth that is to be used for transmitting the PPDU. If the second information is set to a first value, the bandwidth that is to be used for transmitting the data may be determined as the first NCCB. And, if the second information is set to a second value, the bandwidth that is to be used for transmitting the data may be determined as the second NCCB.

For example, if the NCCB bandwidth information is set to 2, the NCCB operation bandwidth may be determined as the 40 MHz or 60 MHz bandwidth (first NCCB bandwidth), wherein the NCCB is performed within the 80 MHz bandwidth. And, if the NCCB bandwidth information is set to 3, the NCCB operation bandwidth may be determined as the 80 MHz, 100 MHz, 120 MHz, or 140 MHz bandwidth (second NCCB bandwidth), wherein the NCCB is performed within the 160 MHz bandwidth.

The second signal field includes third information and fourth information.

The third information includes channel allocation information of the first NCCB bandwidth or the second NCCB bandwidth. The third information may be included in Resource Unit (RU) allocation information within a common field of the second signal field.

If the bandwidth that is to be used for transmitting the data is determined as the first NCCB, the third information may be configured as bit information of $01111y_2y_1y_0$ for the 80 MHz bandwidth. The bit information of $01111y_2y_1y_0$ may include channel allocation information of the 40 MHz or 60 MHz bandwidth. That is, among the 8 bits, a number of cases of NCCB within a maximum of eight 80 MHz bandwidths may be indicated through $y_2y_1y_0$. Actually, since the number of cases of NCCB within the 80 MHz bandwidth is equal to 5, this may be sufficiently indicated through the bit information of $01111y_2y_1y_0$.

If the bandwidth that is to be used for transmitting the data is determined as the second NCCB, the third information may be configured as bit information of $111x_4x_3x_2x_1x_0$ per 80 MHz bandwidth for the 160 MHz bandwidth. The bit information of $111x_4x_3x_2x_1x_0$ may include channel allocation information per 80 MHz bandwidth of the 80 MHz, 100 MHz, 120 MHz, or 140 MHz bandwidth. That is, within the 160 MHz bandwidth, bits of $x_4x_3x_2x_1x_0$ may be used for a first 80 MHz bandwidth, and bits of $x_4x_3x_2x_1x_0$ may be used for a second 80 MHz bandwidth. Therefore, a number of cases of NCCB within the 160 MHz band of a total of 1024 cases (32*32) may be indicated. Actually, since the number of cases of NCCB within the 160 MHz bandwidth is equal to 64, this may be sufficiently indicated through the bit information of the two sets of $111x_4x_3x_2x_1x_0$.

The $01111y_2y_1y_0$ and the $111x_4x_3x_2x_1x_0$ may be included in the reserved bit of the RU allocation information.

The third information may further include allocation information for a null subcarrier, which is determined based on the RU allocation information. The null subcarrier that is included in the first NCCB bandwidth and the second NCCB bandwidth may be used for transmitting the data. This is because, when performing NCCB, the null subcarrier that is defined in the OFDMA RU allocation of 802.11ax is not needed to be used for the purpose of not transmitting data.

The fourth information includes a user field for each 20 MHz being included in the first NCCB bandwidth or the second NCCB bandwidth. At this point, the user field only includes an identifier of the one STA. Additionally, the user field may be identically configured for each 20 MHz being included in the first NCCB bandwidth or the second NCCB bandwidth.

A user field corresponding to 20 MHz (or 242 RU), which may be viewed as a smallest RU unit, may exist in each NCCB bandwidth within the second signal field. However, since the 20 MHz bandwidths being included in the NCCB bandwidth are all allocated to one STA, STA_IDs being included in each user field are the same identifier of the one STA, and the remaining information may all be set (or configured) to have the same value.

Additionally, in order to perform the NCCB, the AP may transmit physical capability information to the one STA.

The physical capability information may include fifth information, sixth information, and seventh information.

The fifth information may be NCCB support information (NCCB support field) on whether or not the NCCB can be supported.

The sixth information may be Channel bandwidth information (Channel width set field) of continuous or non-continuous channels within a 2.4 GHz frequency and 5 GHz frequency. The Channel bandwidth information may also include channel bandwidths for the first NCCB bandwidth and the second NCCB bandwidth.

The seventh information may be information on 20 MHz band(s) being punctured (Punctured preamble RX field) within the 80 MHz bandwidth and the 160 MHz bandwidth. The first NCCB bandwidth and the second NCCB bandwidth may be generated excluding the punctured 20 MHz band(s).

According to the above-described method, wide bandwidth transmission of an STA may be easily performed by using NCCB, channel efficiency of a wireless LAN (WLAN) system may be increased, and throughput of the STA may be enhanced.

Effects of the Disclosure

This specification proposes a scheme for transmitting/receiving data via NCCB in a wireless LAN system.

According to an embodiment proposed in this specification, wide bandwidth transmission of a station (STA) may be easily performed by using NCCB, and channel efficiency of a wireless LAN system may be increased, and a throughput of an STA may be enhanced.

BRIEF DESCRIPTION OF THE DRAWINGS

FIG. 1 is a conceptual view illustrating the structure of a wireless local area network (WLAN).

FIG. 15 illustrates an exemplary format of a PHY capability information field for performing NCCB.

DESCRIPTION OF EXEMPLARY EMBODIMENTS

Figure 2:
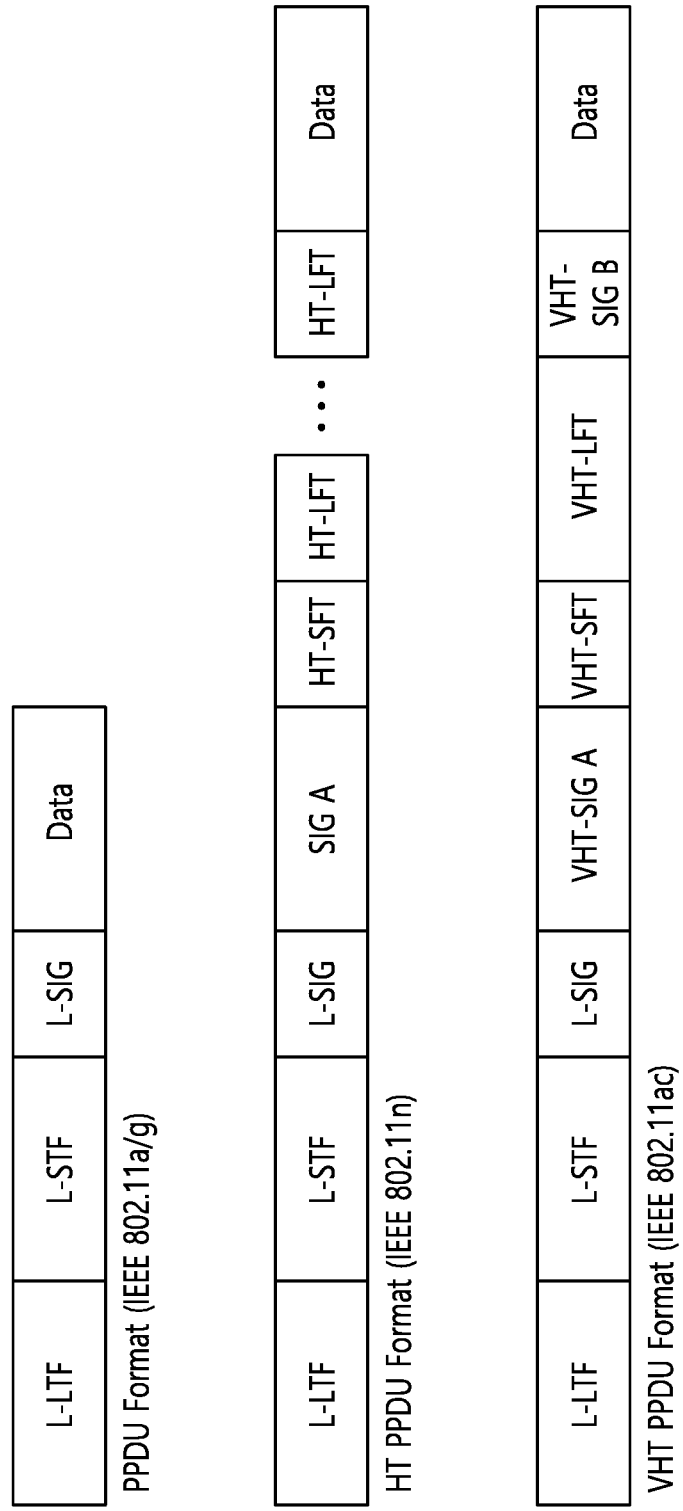
FIG. 2 is a diagram illustrating an example of a PPDU used in an IEEE standard.

FIG. 1 is a conceptual view illustrating the structure of a wireless local area network (WLAN).

An upper part of FIG. 1 illustrates the structure of an infrastructure basic service set (BSS) of institute of electrical and electronic engineers (IEEE) 802.11.

Referring the upper part of FIG. 1, the wireless LAN system may include one or more infrastructure BSSs (100, 105) (hereinafter, referred to as BSS). The BSSs (100, 105), as a set of an AP and an STA such as an access point (AP) (125) and a station (STA1) (100-1) which are successfully synchronized to communicate with each other, are not concepts indicating a specific region. The BSS (105) may include one or more STAs (105-1, 105-2) which may be joined to one AP (130).

The BSS may include at least one STA, APs providing a distribution service, and a distribution system (DS) (110) connecting multiple APs.

The distribution system (110) may implement an extended service set (ESS) (140) extended by connecting the multiple BSSs (100, 105). The ESS (140) may be used as a term indicating one network configured by connecting one or more APs (125, 130) through the distribution system (110). The AP included in one ESS (140) may have the same service set identification (SSID).

A portal (120) may serve as a bridge which connects the wireless LAN network (IEEE 802.11) and another network (e.g., 802.X).

In the BSS illustrated in the upper part of FIG. 1, a network between the APs (125, 130) and a network between the APs (125, 130) and the STAs (100-1, 105-1, 105-2) may be implemented. However, the network is configured even between the STAs without the APs (125, 130) to perform communication. A network in which the communication is performed by configuring the network even between the STAs without the APs (125, 130) is defined as an Ad-Hoc network or an independent basic service set (IBSS).

A lower part of FIG. 1 illustrates a conceptual view illustrating the IBSS.

Referring to the lower part of FIG. 1, the IBSS is a BSS that operates in an Ad-Hoc mode. Since the IBSS does not include the access point (AP), a centralized management entity that performs a management function at the center does not exist. That is, in the IBSS, STAs (150-1, 150-2, 150-3, 155-4, 155-5) are managed by a distributed manner. In the IBS S, all STAs (150-1, 150-2, 150-3, 155-4, 155-5) may be constituted by movable STAs and are not permitted to access the DS to constitute a self-contained network.

The STA as a predetermined functional medium that includes a medium access control (MAC) that follows a regulation of an Institute of Electrical and Electronics Engineers (IEEE) 802.11 standard and a physical layer interface for a radio medium may be used as a meaning including all of the APs and the non-AP stations (STAs).

The STA may be called various a name such as a mobile terminal, a wireless device, a wireless transmit/receive unit (WTRU), user equipment (UE), a mobile station (MS), a mobile subscriber unit, or just a user.

Meanwhile, the term user may be used in various meanings, for example, in wireless LAN communication, this term may be used to signify a STA participating in uplink MU MIMO and/or uplink OFDMA transmission. However, the meaning of this term will not be limited only to this.

FIG. 2 is a diagram illustrating an example of a PPDU used in an IEEE standard.

As illustrated in FIG. 2, various types of PHY protocol data units (PPDUs) may be used in a standard such as IEEE a/g/n/ac, and so on. In detail, LTF and STF fields include a training signal, SIG-A and SIG-B include control information for a receiving station, and a data field includes user data corresponding to a PSDU.

In the embodiment, an improved technique is provided, which is associated with a signal (alternatively, a control information field) used for the data field of the PPDU. The signal provided in the embodiment may be applied onto high efficiency PPDU (HE PPDU) according to an IEEE 802.11ax standard. That is, the signal improved in the embodiment may be HE-SIG-A and/or HE-SIG-B included in the HE PPDU. The HE-SIG-A and the HE-SIG-B may be represented even as the SIG-A and SIG-B, respectively. However, the improved signal proposed in the embodiment is not particularly limited to an HE-SIG-A and/or HE-SIG-B standard and may be applied to control/data fields having various names, which include the control information in a wireless communication system transferring the user data.

Figure 3:
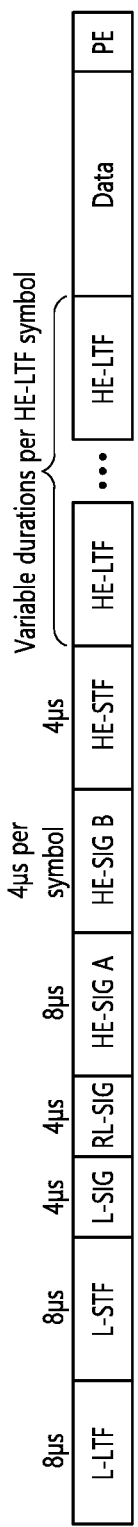
FIG. 3 is a diagram illustrating an example of an HE PDDU.

FIG. 3 is a diagram illustrating an example of an HE PDDU.

The control information field provided in the embodiment may be the HE-SIG-B included in the HE PPDU. The HE PPDU according to FIG. 3 is one example of the PPDU for multiple users and only the PPDU for the multiple users may include the HE-SIG-B and the corresponding HE SIG-B may be omitted in a PPDU for a single user.

As illustrated in FIG. 3, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted during an illustrated time period (that is, 4 or 8 μs).

More detailed description of the respective fields of FIG. 3 will be made below.

Figure 4:
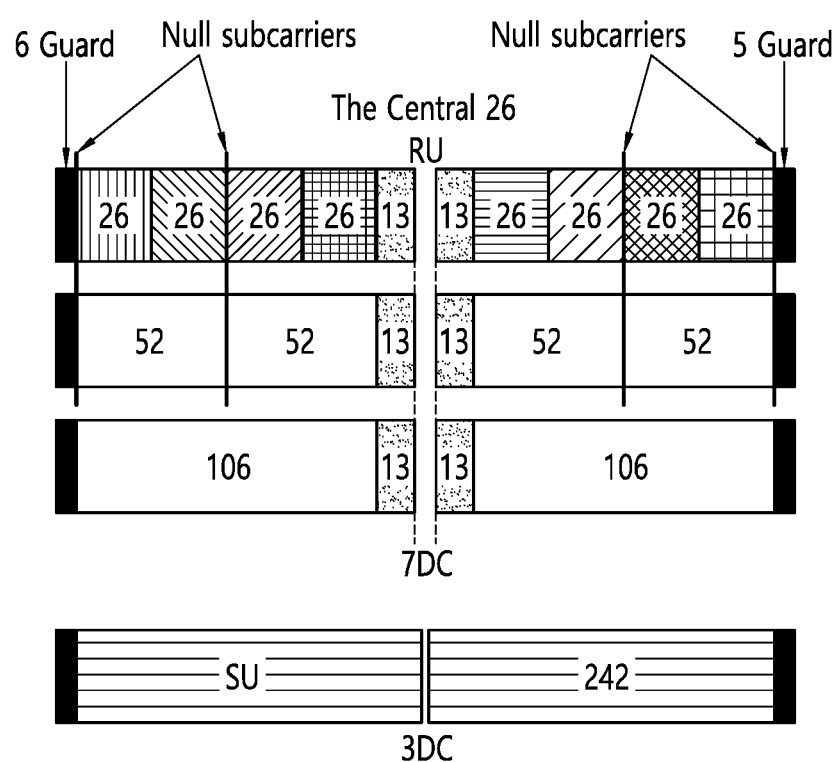
FIG. 4 is a diagram illustrating a layout of resource units (RUs) used in a band of 20 MHz.

FIG. 4 is a diagram illustrating a layout of resource units (RUs) used in a band of 20 MHz.

As illustrated in FIG. 4, resource units (RUs) corresponding to tone (that is, subcarriers) of different numbers are used to constitute some fields of the HE-PPDU. For example, the resources may be allocated by the unit of the RU illustrated for the HE-STF, the HE-LTF, and the data field.

As illustrated in an uppermost part of FIG. 4, 26 units (that is, units corresponding to 26 tones). 6 tones may be used as a guard band in a leftmost band of the 20 MHz band and 5 tones may be used as the guard band in a rightmost band of the 20 MHz band. Further, 7 DC tones may be inserted into a center band, that is, a DC band and a 26-unit corresponding to each 13 tones may be present at left and right sides of the DC band. The 26-unit, a 52-unit, and a 106-unit may be allocated to other bands. Each unit may be allocated for a receiving station, that is, a user.

Meanwhile, the RU layout of FIG. 4 may be used even in a situation for a single user (SU) in addition to the multiple users (MUs) and, in this case, as illustrated in a lowermost part of FIG. 4, one 242-unit may be used and, in this case, three DC tones may be inserted.

In one example of FIG. 4, RUs having various sizes, that is, a 26-RU, a 52-RU, a 106-RU, a 242-RU, and the like are proposed, and as a result, since detailed sizes of the RUs may extend or increase, the embodiment is not limited to a detailed size (that is, the number of corresponding tones) of each RU.

Figure 5:
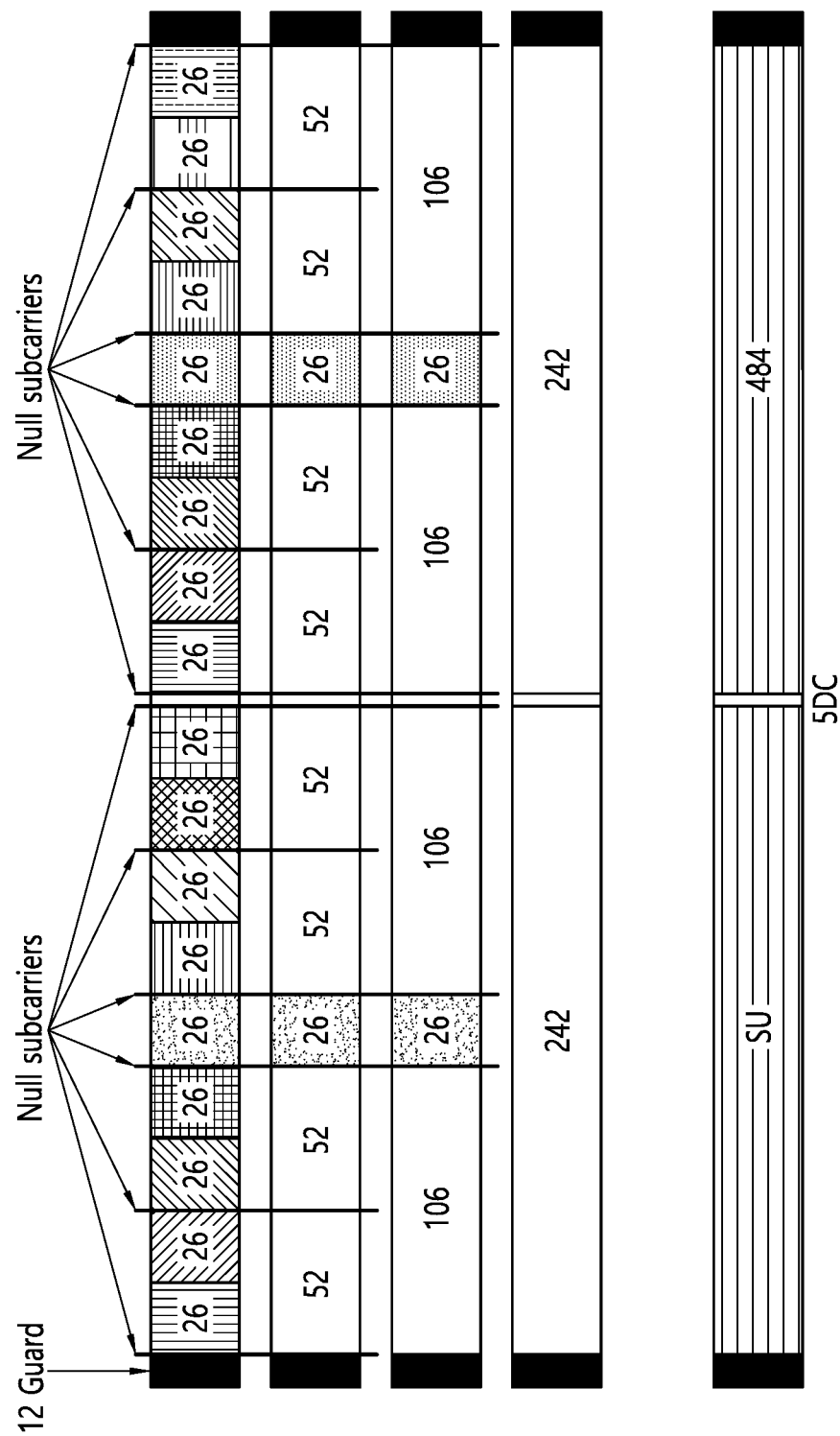
FIG. 5 is a diagram illustrating a layout of resource units (RUs) used in a band of 40 MHz.

FIG. 5 is a diagram illustrating a layout of resource units (RUs) used in a band of 40 MHz.

Similarly to a case in which the RUs having various RUs are used in one example of FIG. 4, 26-RU, 52-RU, 106-RU, 242-RU, 484-RU, and the like, may be used even in one example of FIG. 5. Further, 5 DC tones may be inserted into a center frequency, 12 tones may be used as the guard band in the leftmost band of the 40 MHz band and 11 tones may be used as the guard band in the rightmost band of the 40 MHz band.

In addition, as illustrated in FIG. 5, when the RU layout is used for the single user, the 484-RU may be used. That is, the detailed number of RUs may be modified similarly to one example of FIG. 4.

Figure 6:
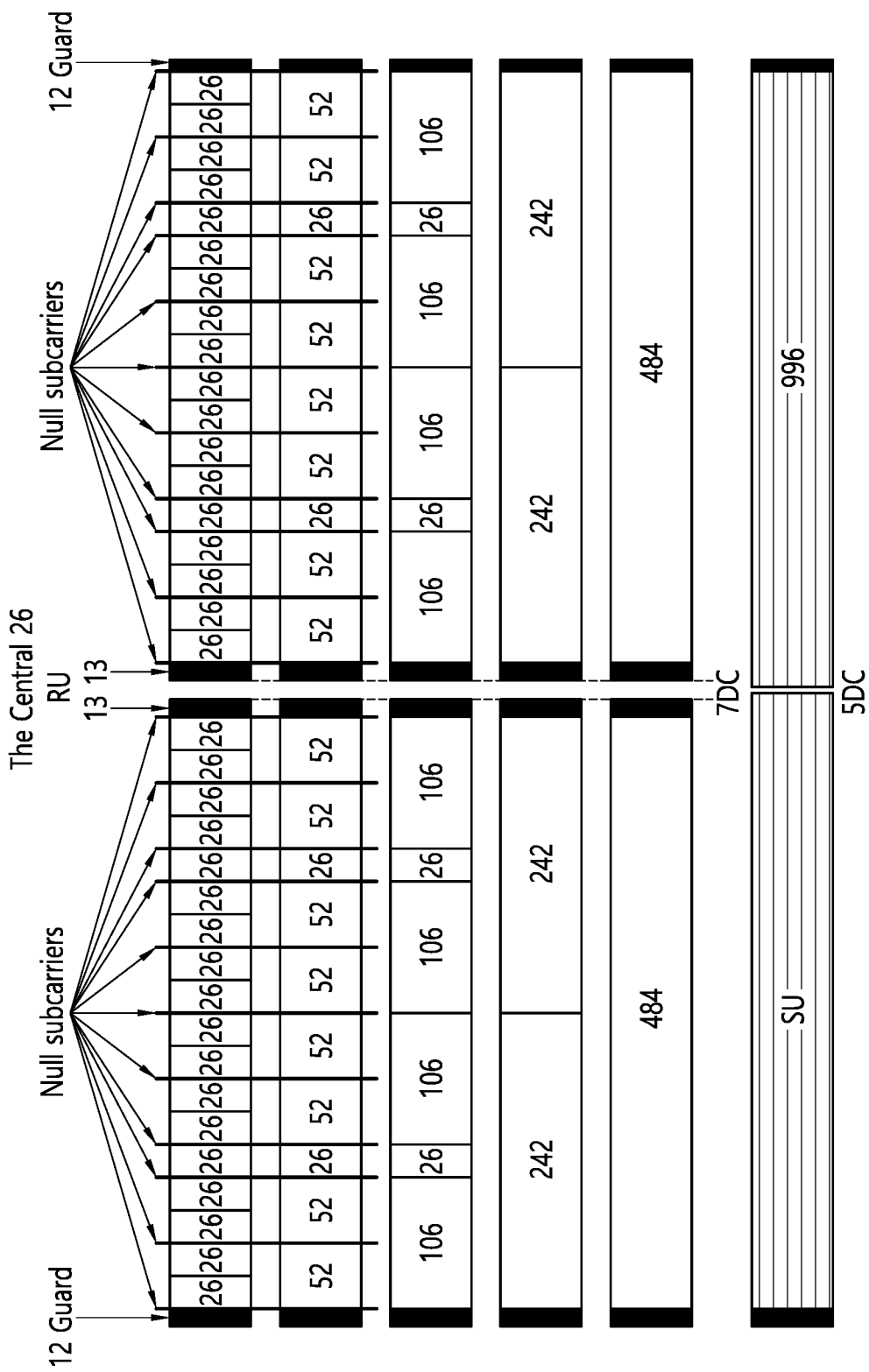
FIG. 6 is a diagram illustrating a layout of resource units (RUs) used in a band of 80 MHz.

FIG. 6 is a diagram illustrating a layout of resource units (RUs) used in a band of 80 MHz.

Similarly to a case in which the RUs having various RUs are used in one example of each of FIG. 4 or 5, 26-RU, 52-RU, 106-RU, 242-RU, 484-RU, and the like, may be used even in one example of FIG. 6. Further, 7 DC tones may be inserted into the center frequency, 12 tones may be used as the guard band in the leftmost band of the 80 MHz band and 11 tones may be used as the guard band in the rightmost band of the 80 MHz band. In addition, the 26-RU may be used, which uses 13 tones positioned at each of left and right sides of the DC band.

Moreover, as illustrated in FIG. 6, when the RU layout is used for the single user, 996-RU may be used and, in this case, 5 DC tones may be inserted.

Meanwhile, the detailed number of RUs may be modified similarly to one example of each of FIG. 4 or FIG. 5.

Figure 7:
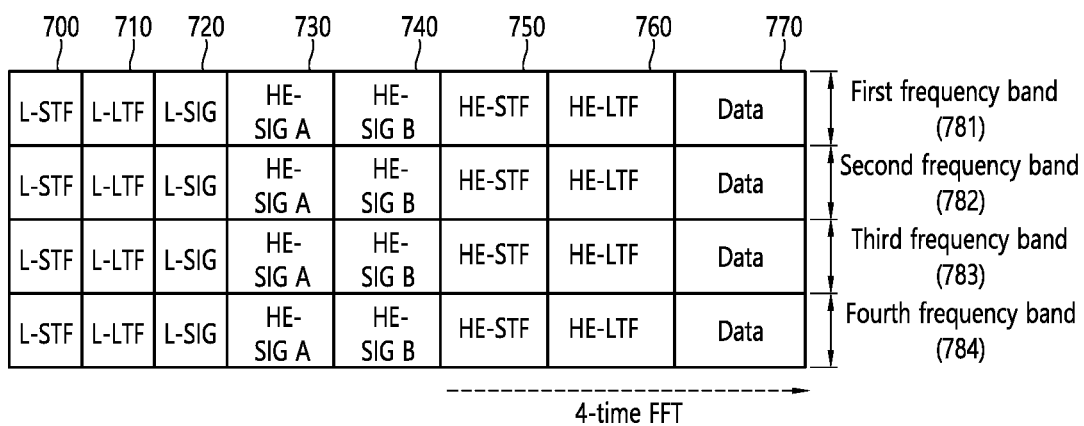
FIG. 7 is a diagram illustrating another example of the HE PPDU.

FIG. 7 is a diagram illustrating another example of the HE PPDU.

A block illustrated in FIG. 7 is another example of describing the HE-PPDU block of FIG. 3 in terms of a frequency.

An illustrated L-STF (700) may include a short training orthogonal frequency division multiplexing (OFDM) symbol. The L-STF (700) may be used for frame detection, automatic gain control (AGC), diversity detection, and coarse frequency/time synchronization.

An L-LTF (710) may include a long training orthogonal frequency division multiplexing (OFDM) symbol. The L-LTF (710) may be used for fine frequency/time synchronization and channel prediction.

An L-SIG (720) may be used for transmitting control information. The L-SIG (720) may include information regarding a data rate and a data length. Further, the L-SIG (720) may be repeatedly transmitted. That is, a new format, in which the L-SIG (720) is repeated (for example, may be referred to as R-LSIG) may be configured.

An HE-SIG-A (730) may include the control information common to the receiving station.

In detail, the HE-SIG-A (730) may include information on 1) a DL/UL indicator, 2) a BSS color field indicating an identify of a BSS, 3) a field indicating a remaining time of a current TXOP period, 4) a bandwidth field indicating at least one of 20, 40, 80, 160 and 80+80 MHz, 5) a field indicating an MCS technique applied to the HE-SIG-B, 6) an indication field regarding whether the HE-SIG-B is modulated by a dual subcarrier modulation technique for MCS, 7) a field indicating the number of symbols used for the HE-SIG-B, 8) a field indicating whether the HE-SIG-B is configured for a full bandwidth MIMO transmission, 9) a field indicating the number of symbols of the HE-LTF, 10) a field indicating the length of the HE-LTF and a CP length, 11) a field indicating whether an OFDM symbol is present for LDPC coding, 12) a field indicating control information regarding packet extension (PE), and 13) a field indicating information on a CRC field of the HE-SIG-A, and the like. A detailed field of the HE-SIG-A may be added or partially omitted. Further, some fields of the HE-SIG-A may be partially added or omitted in other environments other than a multi-user (MU) environment.

In addition, the HE-SIG-A (730) may be composed of two parts: HE-SIG-A1 and HE-SIG-A2. HE-SIG-A1 and HE-SIG-A2 included in the HE-SIG-A may be defined by the following format structure (fields) according to the PPDU. First, the HE-SIG-A field of the HE SU PPDU may be defined as follows.

TABLE 1

| Two Parts of HE-SIG-A | Bit | Field | Number of bits | Description |
|---|---|---|---|---|
| HE-SIG-A1 | B0 | Format | 1 | Differentiate an HE SU PPDU and HE ER SU PPDU from an HE TB PPDU: Set to 1 for an HE SU PPDU and HE ER SU PPDU |
| | B1 | Beam Change | 1 | Set to 1 to indicate that the pre-HE modulated fields of the PPDU are spatially mapped differently from the first symbol of the HE-LTF. Equation (28-6), Equation (28-9), Equation (28-12), Equation (28-14), Equation (28-16) and Equation (28-18) apply if the Beam Change field is set to 1. Set to 0 to indicate that the pre-HE modulated fields of the PPDU are spatially mapped the same way as the first symbol of the HE-LTF on each tone. Equation (28-8), Equation (28-10), Equation (28-13), Equation (28-15), Equation (28-17) and Equation (28-19) apply if the Beam Change field is set to 0. (#16803) |
| | B2 | UL/DL | 1 | Indicates whether the PPDU is sent UL or DL. Set to the value indicated by the TXVECTOR parameter UPLINK_FLAG. |
| | B3-B6 | MCS | 4 | For an HE SU PPDU: Set to n for MCSn, where n = 0, 1, 2, . . . , 11 Values 12-15 are reserved For HE ER SU PPDU with Bandwidth field set to 0 (242-tone RU): Set to n for MCSn, where n = 0, 1, 2 Values 3-15 are reserved For HE ER SU PPDU with Bandwidth field set to 1 (upper frequency 106-tone RU): Set to 0 for MCS 0 Values 1-15 are reserved |
| | B7 | DCM | 1 | Indicates whether or not DCM is applied to the Data field for the MCS indicated. If the STBC field is 0, then set to 1 to indicate that DCM is applied to the Data field. Neither DCM nor STBC shall be applied if(#15489) both the DCM and STBC are set to 1. Set to 0 to indicate that DCM is not applied to the Data field. NOTE-DCM is applied only to HE-MCSs 0, 1, 3 and 4. DCM is applied only to 1 and 2 spatial streams. DCM is not applied in combination with STBC(#15490). |
| | B8-B13 | BSS Color | 6 | The BSS Color field is an identifier of the BSS. Set to the value of the TXVECTOR parameter BSS_COLOR. |
| | B14 | Reserved | 1 | Reserved and set to 1 |
| | B15-B18 | Spatial Reuse | 4 | Indicates whether or not spatial reuse is allowed during the transmission of this PPDU(#16804). Set to a value from Table 28-21 (Spatial Reuse field encoding for an HE SU PPDU, HE ER SU PPDU, and HE MU PPDU), see 27.11.6 (SPATIAL_REUSE). Set to SRP_DISALLOW to prohibit SRP-based spatial reuse during this PPDU. Set to SRP_AND_NON_SRG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |
| | B19-B20 | Bandwidth | 2 | For an HE SU PPDU: Set to 0 for 20 MHz Set to 1 for 40 MHz Set to 2 for 80 MHz Set to 3 for 160 MHz and 80 + 80 MHz For an HE ER SU PPDU: Set to 0 for 242-tone RU Set to 1 for upper frequency 106-tone RU within the primary 20 MHz Values 2 and 3 are reserved |
| | B21-B22 | GI + LTF Size | 2 | Indicates the GI duration and HE-LTF size. Set to 0 to indicate a 1x HE-LTF and 0.8 μs GI Set to 1 to indicate a 2x HE-LTF and 0.8 μs GI Set to 2 to indicate a 2x HE-LTF and 1.6 μs GI Set to 3 to indicate: a 4x HE-LTF and 0.8 μs GI if both the DCM and STBC fields are 1. Neither DCM nor STBC shall be applied if(#Ed) both the DCM and STBC fields are set to 1. a 4x HE-LTF and 3.2 μs GI, otherwise |

TABLE 1-continued

| Two Parts of HE-SIG-A | Bit | Field | Number of bits | Description |
|---|---|---|---|---|
| | B23-B25 | NSTS And Midamble Periodicity | 3 | If the Doppler field is 0, indicates the number of space-time streams. Set to the number of space-time streams minus 1 For an HE ER SU PPDU, values 2 to 7 are reserved If the Doppler field is 1, then B23-B24 indicates the number of space time streams, up to 4, and B25 indicates the midamble periodicity. B23-B24 is set to the number of space time streams minus 1. For an HE ER SU PPDU, values 2 and 3 are reserved B25 is set to 0 if TXVECTOR parameter MIDAMBLE_PERIODICITY is 10 and set to 1 if TXVECTOR parameter MIDAMBLE_PERIODICITY is 20. |
| HE-SIG-A2 (HE SU PPDU)or HE-SIG-A3 (HE ER SU PPDU) | B0-B6 | TXOP | 7 | Set to 127 to indicate no duration information if(#15491) TXVECTOR parameter TXOP_DURATION is set to UNSPECIFIED. Set to a value less than 127 to indicate duration information for NAV setting and protection of the TXOP as follows: If TXVECTOR parameter TXOP_DURAT1ON is less than 512, then B0 is set to 0 and B1-B6 is set to floor(TXOP_DURATION/8)(#16277). Otherwise, B0 is set to 1 and B1-B6 is set to floor ((TXOP_DURATION-512)/128)(#16277). where(#16061) B0 indicates the TXOP length granularity. Set to 0 for 8 µs; otherwise set to 1 for 128 µs. B1-B6 indicates the scaled value of the TXOP_DURATION |
| | B7 | Coding | 1 | Indicates whether BCC or LDPC is used: Set to 0 to indicate BCC Set to 1 to indicate LDPC |
| | B8 | LDPC Extra Symbol Segment | 1 | Indicates the presence of the extra OFDM symbol segment for LDPC: Set to 1 if an extra OFDM symbol segment for LDPC is present Set to 0 if an extra OFDM symbol segment for LDPC is not present Reserved and set to 1 if the Coding field is set to 0(#15492). |
| | B9 | STBC | 1 | If the DCM field is set to 0, then set to 1 if space time block coding is used. Neither DCM nor STBC shall be applied if(#15493) both the DCM field and STBC field are set to 1. Set to 0 otherwise. |
| | B10 | Beamformed(#16038) | 1 | Set to 1 if a beamforming steering matrix is applied to the waveform in an SU transmission. Set to 0 otherwise. |
| | B11-B12 | Pre-FEC Padding Factor | 2 | Indicates the pre-FEC padding factor. Set to 0 to indicate a pre-FEC padding factor of 4 Set to 1 to indicate a pre-FEC padding factor of 1 Set to 2 to indicate a pre-FEC padding factor of 2 Set to 3 to indicate a pre-FEC padding factor of 3 |
| | B13 | PE Disambiguity | 1 | Indicates PE disambiguity(#16274) as defined in 28.3.12 (Packet extension). |
| | B14 | Reserved | 1 | Reserved and set to 1 |
| | B15 | Doppler | 1 | Set to 1 if one of the following applies: The number of OFDM symbols in the Data field is larger than the signaled midamble periodicity plus 1 and the midamble is present The number of OFDM symbols in the Data field is less than or equal to the signaled midamble periodicity plus 1 (see 28.3.11.16 Midamble), the midamble is not present, but the channel is fast varying. It recommends that midamble may be used for the PPDUs of the reverse link. Set to 0 otherwise. |
| | B16-B19 | CRC | 4 | CRC for bits 0-41 of the HE-SIG-A field (see 28.3.10.7.3 (CRC computation)). Bits 0-41 of the HE-SIG-A field correspond to bits 0-25 of HE-SIG-A1 followed by bits 0-15 of HE-SIG-A2). |
| | B20-B25 | Tail | 6 | Used to terminate the trellis of the convolutional decoder. Set to 0. |

In addition, the HE-SIG-A field of the HE MU PPDU may be defined as follows.

TABLE 2

| Two Parts of HE-SIG-A | Bit | Field | Number of bits | Description |
|---|---|---|---|---|
| HE-SIG-A1 | B0 | UL/DL | 1 | Indicates whether the PPDU is sent UL or DL. Set to the value indicated by the TXVECTOR parameter UPLINK_FLAG. (#16805) NOTE-The TDLS peer can identify the TDLS frame by To DS and From DS fields in the MAC header of the MPDU. |
| | B1-B3 | SIGB MCS | 3 | Indicates the MCS of the HE-SIG-B field: Set to 0 for MCS 0 Set to 1 for MCS 1 Set to 2 for MCS 2 Set to 3 for MCS 3 Set to 4 for MCS 4 Set to 5 for MCS 5 The values 6 and 7 are reserved |
| | B4 | SIGB DCM | 1 | Set to 1 indicates that the HE-SIG-B is modulated with DCM for the MCS. Set to 0 indicates that the HE-SIG-B is not modulated with DCM for the MCS. NOTE-DCM is only applicable to MCS 0, MCS 1, MCS 3, and MCS 4. |
| | B5-B10 | BSS Color | 6 | The BSS Color field is an identifier of the BSS. Set to the value of the TXVECTOR parameter BSS_COLOR. |
| | B11-B14 | Spatial Reuse | 4 | Indicates whether or not spatial reuse is allowed during the transmission of this PPDU(#16806). Set to the value of the SPATIAL_REUSE parameter of the TXVECTOR, which contains a value from Table 28-21 (Spatial Reuse field encoding for an HE SU PPDU, HE ER SU PPDU, and HE MU PPDU) (see 27.11.6 (SPATIAL_REUSE)). Set to SRP_DISALLOW to prohibit SRP-based spatial reuse during this PPDU. Set to SRP_AND_NON_SRG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |
| | B15-B17 | Bandwidth | 3 | Set to 0 for 20 MHz. Set to 1 for 40 MHz. Set to 2 for 80 MHz non-preamble puncturing mode. Set to 3 for 160 MHz and 80 + 80 MHz non-preamble puncturing mode. If the SIGB Compression field is 0: Set to 4 for preamble puncturing in 80 MHz, where in the preamble only the secondary 20 MHz is punctured. Set to 5 for preamble puncturing in 80 MHz, where in the preamble only one of the two 20 MHz subchannels in secondary 40 MHz is punctured. Set to 6 for preamble puncturing in 160 MHz or 80 + 80 MHz, where in the primary 80 MHz of the preamble only the secondary 20 MHz is punctured. Set to 7 for preamble puncturing in 160 MHz or 80 + 80 MHz, where in the primary 80 MHz of the preamble the primary 40 MHz is present. If the SIGB Compression field is 1 then values 4-7 are reserved. |
| | B18-B21 | Number Of HE-SIG-B Symbols Or MU-MIMO Users | 4 | If the HE-SIG-B Compression field is set to 0, indicates the number of OFDM symbols in the HE-SIG-B field: (#15494) Set to the number of OFDM symbols in the HE-SIG-B field minus 1 if the number of OFDM symbols in the HE-SIG-B field is less than 16; Set to 15 to indicate that the number of OFDM symbols in the HE-SIG-B field is equal to 16 if Longer Than 16 HE SIG-B OFDM Symbols Support sub-field of the HE Capabilities element transmitted by at least one recipient STA is 0; Set to 15 to indicate that the number of OFDM symbols in the HE-SIG-B field is greater than or equal to 16 if the Longer than 16 HE SIG-B OFDM Symbols Support subfield of the HE Capabilities element transmitted by all the recipient STAs are 1 and if the HE-SIG-B data rate is less than MCS 4 without |

TABLE 2-continued

| Two Parts of HE-SIG-A | Bit | Field | Number of bits | Description |
|---|---|---|---|---|
| | B22 | SIGB Compression | 1 | DCM. The exact number of OFDM symbols in the HE-SIG-B field is calculated based on the number of User fields in the HE-SIG-B content channel which is indicated by HE-SIG-B common field in this case. If the HE-SIG-B Compression field is set to 1, indicates the number of MU-MIMO users and is set to the number of NU-MIMO users minus 1(#15495). Set to 0 if the Common field in HE-SIG-B is present. Set to 1 if the Common field in HE-SIG-B is not present. (#16139) |
| | B23-B24 | GI + LTF Size | 2 | Indicates the GI duration and HE-LTF size: Set to 0 to indicate a 4x HE-LTF and 0.8 µs GI Set to 1 to indicate a 2x HE-LTF and 0.8 µs GI Set to 2 to indicate a 2x HE-LTF and 1.6 µs GI Set to 3 to indicate a 4x HE-LTF and 3.2 µs GI |
| | B25 | Doppler | 1 | Set to 1 if one of the following applies: The number of OFDM symbols in the Data field is larger than the signaled midamble periodicity plus 1 and the midamble is present The number of OFDM symbols in the Data field is less than or equal to the signaled midamble periodicity plus 1 (see 28.3.11.16 Midamble), the midamble is not present, but the channel is fast varying. It recommends that midamble may be used for the PPDUs of the reverse link. Set to 0 otherwise. |
| HE-SIG-A2 | B0-B6 | TXOP | 7 | Set to 127 to indicate no duration information if(#15496) TXVECTOR parameter TXOP_DURATION is set to UNSPECIFIED. Set to a value less than 127 to indicate duration information for NAV setting and protection of the TXOP as follows: If TXVECTOR parameter TXOP_DURATION is less than 512, then B0 is set to 0 and B1-B6 is set to floor(TXOP_DURATION/8)(#16277). Otherwise, B0 is set to 1 and B1-B6 is set to floor ((TXOP_DURATION-512)/128)(#16277). where(#16061) B0 indicates the TXOP length granularity. Set to 0 for 8 µs; otherwise set to 1 for 128 µs. B1-B6 indicates the scaled value of the TXOP_DURATION |
| | B7 | Reserved | 1 | Reserved and set to 1 |
| | B8-B10 | Number of HE-LTF Symbols And Midamble Periodicity | 3 | If the Doppler field is set to 0(#15497), indicates the number of HE-LTF symbols: Set to 0 for 1 HE-LTF symbol Set to 1 for 2 HE-LTF symbols Set to 2 for 4 HE-LTF symbols Set to 3 for 6 HE-LTF symbols Set to 4 for 8 HE-LTF symbols Other values are reserved. If the Doppler field is set to 1(#15498), B8-B9 indicates the number of HE-LTF symbols(#16056) and B10 indicates midamble periodicity: B8-B9 is encoded as follows: 0 indicates 1 HE-LTF symbol 1 indicates 2 HE-LTF symbols 2 indicates 4 HE-LTF symbols 3 is reserved B10 is set to 0 if the TXVECTOR parameter MIDAMBLE_PERIODICITY is 10 and set to 1 if the TXVECTOR parameter PREAMBLE_PERIODICITY is 20. |
| | B11 | LDPC Extra Symbol Segment | 1 | Indication of the presence of the extra OFDM symbol segment for LDPC. Set to 1 if an extra OFDM symbol segment for LDPC is present. Set to 0 otherwise. |
| | B12 | STBC | 1 | In an HE MU PPDU where each RU includes no more than 1 user, set to 1 to indicate all RUs are STBC encoded in the payload, set to 0 to indicate all RUs are not STBC encoded in the payload. STBC does not apply to HE-SIG-B. STBC is not applied if one or more RUs are used for MU-MIMO allocation. (#15661) |

TABLE 2-continued

| Two Parts of HE-SIG-A | Bit | Field | Number of bits | Description |
|---|---|---|---|---|
| | B13-B14 | Pre-FEC Padding Factor | 2 | Indicates the pre-FEC padding factor. Set to 0 to indicate a pre-FEC padding factor of 4 Set to 1 to indicate a pre-FEC padding factor of 1 Set to 2 to indicate a pre-FEC padding factor of 2 Set to 3 to indicate a pre-FEC padding factor of 3 |
| | B15 | PE Disambiguity | 1 | Indicates PE disambiguity(#16274) as defined in 28.3.12 (Packet extension). |
| | B16-B19 | CRC | 4 | CRC for bits 0-41 of the HE-SIG-A field (see 28.3.10.7.3 (CRC computation)). Bits 0-41 of the HE-SIG-A field correspond to bits 0-25 of HE-SIG-A1 followed by bits 0-15 of HE-SIG-A2). |
| | B20-B25 | Tail | 6 | Used to terminate the trellis of the convolutional decoder. Set to 0. |

In addition, the HE-SIG-A field of the HE TB PPDU may be defined as follows.

TABLE 3

| Two Parts of HE-SIG-A | Bit | Field | Number of bits | Description |
|---|---|---|---|---|
| HE-SIG-A1 | B0 | Format | 1 | Differentiate an HE SU PPDU and HE ER SU PPDU from an HE TB PPDU: Set to 0 for an HE TB PPDU |
| | B1-B6 | BSS Color | 6 | The BSS Color field is an identifier of the BSS. Set to the value of the TXVECTOR parameter BSS_COLOR. |
| | B7-B10 | Spatial Reuse 1 | 4 | Indicates whether or not spatial reuse is allowed in a subband of the PPDU during the transmission of this PPDU, and if allowed, indicates a value that is used to determine a limit on the transmit power of a spatial reuse transmission. If the Bandwidth field indicates 20 MHz, 40 MHz, or 80 MHz then this Spatial Reuse field applies to the first 20 MHz subband. If the Bandwidth field indicates 160/80 + 80 MHz then this Spatial Reuse field applies to the first 40 MHz sub-band of the 160 MHz operating band. Set to the value of the SPATIAL_REUSE(1) parameter of the TXVECTOR, which contains a value from Table 28-22 (Spatial Reuse field encoding for an HE TB PPDU) for an HE TB PPDU (see 27.11.6 (SPATIAL_REUSE)). Set to SRP_DISALLOW to prohibit SRP-based spatial reuse during this PPDU. Set to SRP_AND_NON_SRG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |
| | B11-B14 | Spatial Reuse 2 | 4 | Indicates whether or not spatial reuse is allowed in a subband of the PPDU during the transmission of this PPDU, and if allowed, indicates a value that is used to determine a limit on the transmit power of a spatial reuse transmission. If the Bandwidth field indicates 20 MHz, 40 MHz, or 80 MHz: This Spatial Reuse field applies to the second 20 MHz subband. If(#Ed) the STA operating channel width is 20 MHz, then this field is set to the same value as Spatial Reuse 1 field. If(#Ed) the STA operating channel width is 40 MHz in the 2.4 GHz band, this field is set to the same value as Spatial Reuse 1 field. If the Bandwidth field indicates 160/80 + 80 MHz the this Spatial Reuse field applies to the second 40 MHz subband of the 160 MHz operating band. Set to the value of the SPATIAL_REUSE(2) parameter of the TXVECTOR, which contains a value from Table 28-22 (Spatial Reuse field encoding for an HE TB PPDU) for an HE TB PPDU (see 27.11.6 (SPATIAL_REUSE)). |

TABLE 3-continued

| Two Parts of HE-SIG-A | Bit | Field | Number of bits | Description |
|---|---|---|---|---|
| | | | | Set to SRP_DISALLOW to prohibit SRP-based spatial reuse during this PPDU. Set to SRP_AND_NON_SRG_OBSS_PD_PROIHBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |
| | B15-B18 | Spatial Reuse 3 | 4 | Indicates whether or not spatial reuse is allowed in a subband of the PPDU during the transmission of this PPDU, and if allowed, indicates a value that is used to determine a limit on the transmit power of a spatial reuse transmission. If the Bandwidth field indicates 20 MHz, 40 MHz or 80 MHz: This Spatial Reuse field applies to the third 20 MHz subband. If(#Ed) the STA operating channel width is 20 MHz or 40 MHz, this field is set to the same value as Spatial Reuse 1 field. If the Bandwidth field indicates 160/80 + 80 MHz: This Spatial Reuse field applies to the third 40 MHz subband of the 160 MHz operating band. If(#Ed) the STA operating channel width is 80 + 80 MHz, this field is set to the same value as Spatial Reuse 1 field. Set to the value of the SPATIAL_REUSE(3) parameter of the TXVECTOR, which contains a value from Table 28-22 (Spatial Reuse field encoding for an HE TB PPDU) for an HE TB PPDU (see 27.11.6 (SPATIAL_REUSE)). Set to SRP_DISALLOW to prohibit SRP-based spatial reuse during this PPDU. Set to SRP_AND_NON_SRG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |
| | B19-B22 | Spatial Reuse 4 | 4 | Indicates whether or not spatial reuse is allowed in a subband of the PPDU during the transmission of this PPDU, and if allowed, indicates a value that is used to determine a limit on the transmit power of a spatial reuse transmission. If the Bandwidth field indicates 20 MHz, 40 MHz or 80 MHz: This Spatial Reuse field applies to the fourth 20 MHz subband. If(#Ed) the STA operating channel width is 20 MHz, then this field is set to the same value as Spatial Reuse 1 field. If(#Ed) the STA operating channel width is 40 MHz, then this field is set to the same value as Spatial Reuse 2 field. If the Bandwidth field indicates 160/80 + 80 MHz: This Spatial Reuse field applies to the fourth 40 MHz subband of the 160 MHz operating band. If(#Ed) the STA operating channel width is 80 + 80 MHz, then this field is set to same value as Spatial Reuse 2 field. Set to the value of the SPATIAL_REUSE(4) parameter of the TXVECTOR, which contains a value from Table 28-22 (Spatial Reuse field encoding for an HE TB PPDU) for an HE TB PPDU (see 27.11.6 (SPATIAL_REUSE)). Set to SRP_DISALLOW to prohibit SRP-based spatial reuse during this PPDU. Set to SRP_AND_NON_SRG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |
| | B23 | Reserved | 1 | Reserved and set to 1. NOTE-Unlike other Reserved fields in HE-SIG-A of the HE TB PPDU, B23 does not have a corresponding bit in the Trigger frame. |
| | B24-B25 | Bandwidth | 2 | (#16003)Set to 0 for 20 MHz Set to 1 for 40 MHz Set to 2 for 80 MHz Set to 3 for 160 MHz and 80 + 80 MHz |

TABLE 3-continued

| Two Parts of HE-SIG-A | Bit | Field | Number of bits | Description |
|---|---|---|---|---|
| HE-STG-A2 | B0-B6 | TXOP | 7 | Set to 127 to indicate no duration information if(#15499) TXVECTOR parameter TXOP_DURATION is set to UNSPECIFIED. Set to a value less than 127 to indicate duration information for NAV setting and protection of the TXOP as follows: If TXVECTOR parameter TXOP_DURATION is less than 512, then B0 is set to 0 and B1-B6 is set to floor(TXOP_DURATION/8)(#16277). Otherwise, B0 is set to 1 and B1-B6 is set to floor ((TXOP_DURATION - 512)/128)(#16277). where(#16061) B0 indicates the TXOP length granularity. Set to 0 for 8 μs: otherwise set to 1 for 128 μs. B1-B6 indicates the scaled value of the TXOP_DURATION |
| | B7-B15 | Reserved | 9 | Reserved and set to value indicated in the UL HE-SIG-A2 Reserved subfield in the Trigger frame. |
| | B16-B19 | CRC | 4 | CRC of bits 0-41 of the HE-SIG-A field. See 28.3.10.7.3 (CRC computation). Bits 0-41 of the HE-SIG-A field correspond to bits 0-25 of HE-SIG-A1 followed by bits 0-15 of HE-SIG-A2). |
| | B20-B25 | Tail | 6 | Used to terminate the trellis of the convolutional decoder. Set to 0. |

An HE-SIG-B (740) may be included only in the case of the PPDU for the multiple users (MUs) as described above. Principally, an HE-SIG-A (750) or an HE-SIG-B (760) may include resource allocation information (alternatively, virtual resource allocation information) for at least one receiving STA.

Figure 8:
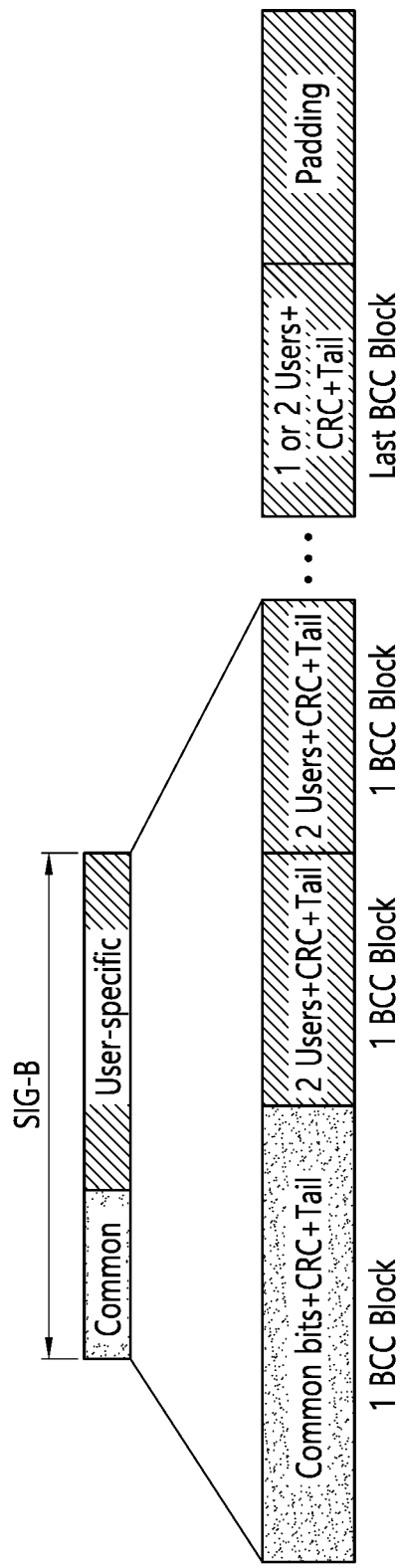
FIG. 8 is a block diagram illustrating one example of HE-SIG-B according to an embodiment.

FIG. 8 is a block diagram illustrating one example of HE-SIG-B according to an embodiment.

As illustrated in FIG. 8, the HE-SIG-B field includes a common field at a frontmost part and the corresponding common field is separated from a field which follows therebehind to be encoded. That is, as illustrated in FIG. 8, the HE-SIG-B field may include a common field including the common control information and a user-specific field including user-specific control information. In this case, the common field may include a CRC field corresponding to the common field, and the like and may be coded to be one BCC block. The user-specific field subsequent thereafter may be coded to be one BCC block including the "user-specific field" for 2 users and a CRC field corresponding thereto as illustrated in FIG. 8.

A previous field of the HE-SIG-B (740) may be transmitted in a duplicated form on a MU PPDU. In the case of the HE-SIG-B (740), the HE-SIG-B (740) transmitted in some frequency band (e.g., a fourth frequency band) may even include control information for a data field corresponding to a corresponding frequency band (that is, the fourth frequency band) and a data field of another frequency band (e.g., a second frequency band) other than the corresponding frequency band. Further, a format may be provided, in which the HE-SIG-B (740) in a specific frequency band (e.g., the second frequency band) is duplicated with the HE-SIG-B (740) of another frequency band (e.g., the fourth frequency band). Alternatively, the HE-SIG B (740) may be transmitted in an encoded form on all transmission resources. A field after the HE-SIG B (740) may include individual information for respective receiving STAs receiving the PPDU.

The HE-STF (750) may be used for improving automatic gain control estimation in a multiple input multiple output (MIMO) environment or an OFDMA environment.

The HE-LTF (760) may be used for estimating a channel in the MIMO environment or the OFDMA environment.

The size of fast Fourier transform (FFT)/inverse fast Fourier transform (IFFT) applied to the HE-STF (750) and the field after the HE-STF (750), and the size of the FFT/IFFT applied to the field before the HE-STF (750) may be different from each other. For example, the size of the FFT/IFFT applied to the HE-STF (750) and the field after the HE-STF (750) may be four times larger than the size of the FFT/IFFT applied to the field before the HE-STF (750).

For example, when at least one field of the L-STF (700), the L-LTF (710), the L-SIG (720), the HE-SIG-A (730), and the HE-SIG-B (740) on the PPDU of FIG. 7 is referred to as a first field, at least one of the data field (770), the HE-STF (750), and the HE-LTF (760) may be referred to as a second field. The first field may include a field associated with a legacy system and the second field may include a field associated with an HE system. In this case, the fast Fourier transform (FFT) size and the inverse fast Fourier transform (IFFT) size may be defined as a size which is N (N is a natural number, e.g., N=1, 2, and 4) times larger than the FFT/IFFT size used in the legacy wireless LAN system. That is, the FFT/IFFT having the size may be applied, which is N (=4) times larger than the first field of the HE PPDU. For example, 256 FFT/IFFT may be applied to a bandwidth of 20 MHz, 512 FFT/IFFT may be applied to a bandwidth of 40 MHz, 1024 FFT/IFFT may be applied to a bandwidth of 80 MHz, and 2048 FFT/IFFT may be applied to a bandwidth of continuous 160 MHz or discontinuous 160 MHz.

In other words, a subcarrier space/subcarrier spacing may have a size which is 1/N times (N is the natural number, e.g., N=4, the subcarrier spacing is set to 78.125 kHz) the subcarrier space used in the legacy wireless LAN system. That is, subcarrier spacing having a size of 312.5 kHz, which is legacy subcarrier spacing may be applied to the first field of the HE PPDU and a subcarrier space having a size of 78.125 kHz may be applied to the second field of the HE PPDU.

Alternatively, an IDFT/DFT period applied to each symbol of the first field may be expressed to be N (=4) times shorter than the IDFT/DFT period applied to each data symbol of the second field. That is, the IDFT/DFT length applied to each symbol of the first field of the HE PPDU may be expressed as 3.2 μs and the IDFT/DFT length applied to each symbol of the second field of the HE PPDU may be expressed as 3.2 μs*4 (=12.8 μs). The length of the OFDM symbol may be a value acquired by adding the length of a guard interval (GI) to the IDFT/DFT length. The length of the GI may have various values such as 0.4 μs, 0.8 μs, 1.6 μs, 2.4 μs, and 3.2 μs.

For simplicity in the description, in FIG. 7, it is expressed that a frequency band used by the first field and a frequency band used by the second field accurately coincide with each other, but both frequency bands may not completely coincide with each other, in actual. For example, a primary band of the first field (L-STF, L-LTF, L-SIG, HE-SIG-A, and HE-SIG-B) corresponding to the first frequency band may be the same as the most portions of a frequency band of the second field (HE-STF, HE-LTF, and Data), but boundary surfaces of the respective frequency bands may not coincide with each other. As illustrated in FIGS. 4 to 6, since multiple null subcarriers, DC tones, guard tones, and the like are inserted during arranging the RUs, it may be difficult to accurately adjust the boundary surfaces.

The user (e.g., a receiving station) may receive the HE-SIG-A (730) and may be instructed to receive the downlink PPDU based on the HE-SIG-A (730). In this case, the STA may perform decoding based on the FFT size changed from the HE-STF (750) and the field after the HE-STF (750). On the contrary, when the STA may not be instructed to receive the downlink PPDU based on the HE-SIG-A (730), the STA may stop the decoding and configure a network allocation vector (NAV). A cyclic prefix (CP) of the HE-STF (750) may have a larger size than the CP of another field and the during the CP period, the STA may perform the decoding for the downlink PPDU by changing the FFT size.

Hereinafter, in the embodiment of the present disclosure, data (alternatively, or a frame) which the AP transmits to the STA may be expressed as a terms called downlink data (alternatively, a downlink frame) and data (alternatively, a frame) which the STA transmits to the AP may be expressed as a term called uplink data (alternatively, an uplink frame). Further, transmission from the AP to the STA may be expressed as downlink transmission and transmission from the STA to the AP may be expressed as a term called uplink transmission.

In addition, a PHY protocol data unit (PPDU), a frame, and data transmitted through the downlink transmission may be expressed as terms such as a downlink PPDU, a downlink frame, and downlink data, respectively. The PPDU may be a data unit including a PPDU header and a physical layer service data unit (PSDU) (alternatively, a MAC protocol data unit (MPDU)). The PPDU header may include a PHY header and a PHY preamble and the PSDU (alternatively, MPDU) may include the frame or indicate the frame (alternatively, an information unit of the MAC layer) or be a data unit indicating the frame. The PHY header may be expressed as a physical layer convergence protocol (PLCP) header as another term and the PHY preamble may be expressed as a PLCP preamble as another term.

Further, a PPDU, a frame, and data transmitted through the uplink transmission may be expressed as terms such as an uplink PPDU, an uplink frame, and uplink data, respectively.

In the wireless LAN system to which the embodiment of the present description is applied, the total bandwidth may be used for downlink transmission to one STA and uplink transmission to one STA. Further, in the wireless LAN system to which the embodiment of the present description is applied, the AP may perform downlink (DL) multi-user (MU) transmission based on multiple input multiple output (MU MIMO) and the transmission may be expressed as a term called DL MU MIMO transmission.

In addition, in the wireless LAN system according to the embodiment, an orthogonal frequency division multiple access (OFDMA) based transmission method is preferably supported for the uplink transmission and/or downlink transmission. That is, data units (e.g., RUs) corresponding to different frequency resources are allocated to the user to perform uplink/downlink communication. In detail, in the wireless LAN system according to the embodiment, the AP may perform the DL MU transmission based on the OFDMA and the transmission may be expressed as a term called DL MU OFDMA transmission. When the DL MU OFDMA transmission is performed, the AP may transmit the downlink data (alternatively, the downlink frame and the downlink PPDU) to the plurality of respective STAs through the plurality of respective frequency resources on an overlapped time resource. The plurality of frequency resources may be a plurality of subbands (alternatively, subchannels) or a plurality of resource units (RUs). The DL MU OFDMA transmission may be used together with the DL MU MIMO transmission. For example, the DL MU MIMO transmission based on a plurality of space-time streams (alternatively, spatial streams) may be performed on a specific subband (alternatively, subchannel) allocated for the DL MU OFDMA transmission.

Further, in the wireless LAN system according to the embodiment, uplink multi-user (UL MU) transmission in which the plurality of STAs transmits data to the AP on the same time resource may be supported. Uplink transmission on the overlapped time resource by the plurality of respective STAs may be performed on a frequency domain or a spatial domain.

When the uplink transmission by the plurality of respective STAs is performed on the frequency domain, different frequency resources may be allocated to the plurality of respective STAs as uplink transmission resources based on the OFDMA. The different frequency resources may be different subbands (alternatively, subchannels) or different resources units (RUs). The plurality of respective STAs may transmit uplink data to the AP through different frequency resources. The transmission method through the different frequency resources may be expressed as a term called a UL MU OFDMA transmission method.

When the uplink transmission by the plurality of respective STAs is performed on the spatial domain, different time-space streams (alternatively, spatial streams) may be allocated to the plurality of respective STAs and the plurality of respective STAs may transmit the uplink data to the AP through the different time-space streams. The transmission method through the different spatial streams may be expressed as a term called a UL MU MIMO transmission method.

The UL MU OFDMA transmission and the UL MU MIMO transmission may be used together with each other. For example, the UL MU MIMO transmission based on the plurality of space-time streams (alternatively, spatial streams) may be performed on a specific subband (alternatively, subchannel) allocated for the UL MU OFDMA transmission.

In the legacy wireless LAN system which does not support the MU OFDMA transmission, a multi-channel allocation method is used for allocating a wider bandwidth (e.g., a 20 MHz excess bandwidth) to one terminal. When a channel unit is 20 MHz, multiple channels may include a plurality of 20 MHz-channels. In the multi-channel allocation method, a primary channel rule is used to allocate the wider bandwidth to the terminal. When the primary channel rule is used, there is a limit for allocating the wider bandwidth to the terminal. In detail, according to the primary channel rule, when a secondary channel adjacent to a primary channel is used in an overlapped BSS (OBSS) and is thus busy, the STA may use remaining channels other than the primary channel. Therefore, since the STA may transmit the frame only to the primary channel, the STA receives a limit for transmission of the frame through the multiple channels. That is, in the legacy wireless LAN system, the primary channel rule used for allocating the multiple channels may be a large limit in obtaining a high throughput by operating the wider bandwidth in a current wireless LAN environment in which the OBSS is not small.

In order to solve the problem, in the embodiment, a wireless LAN system is disclosed, which supports the OFDMA technology. That is, the OFDMA technique may be applied to at least one of downlink and uplink. Further, the MU-MIMO technique may be additionally applied to at least one of downlink and uplink. When the OFDMA technique is used, the multiple channels may be simultaneously used by not one terminal but multiple terminals without the limit by the primary channel rule. Therefore, the wider bandwidth may be operated to improve efficiency of operating a wireless resource.

As described above, in case the uplink transmission performed by each of the multiple STAs (e.g., non-AP STAs) is performed within the frequency domain, the AP may allocate different frequency resources respective to each of the multiple STAs as uplink transmission resources based on OFDMA. Additionally, as described above, the frequency resources each being different from one another may correspond to different subbands (or sub-channels) or different resource units (RUs).

The different frequency resources respective to each of the multiple STAs are indicated through a trigger frame.

Figure 9:
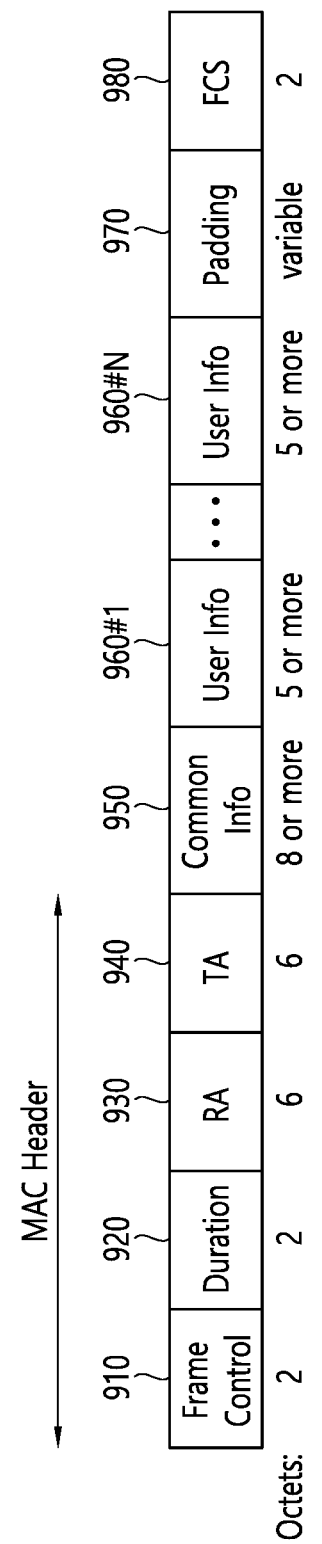
FIG. 9 illustrates an example of a trigger frame.

FIG. 9 illustrates an example of a trigger frame. The trigger frame of FIG. 9 allocates resources for Uplink Multiple-User (MU) transmission and may be transmitted from the AP. The trigger frame may be configured as a MAC frame and may be included in the PPDU. For example, the trigger frame may be transmitted through the PPDU shown in FIG. 3, through the legacy PPDU shown in FIG. 2, or through a certain PPDU, which is newly designed for the corresponding trigger frame. In case the trigger frame is transmitted through the PPDU of FIG. 3, the trigger frame may be included in the data field shown in the drawing.

Each of the fields shown in FIG. 9 may be partially omitted, or other fields may be added. Moreover, the length of each field may be varied differently as shown in the drawing.

A Frame Control field (910) shown in FIG. 9 may include information related to a version of the MAC protocol and other additional control information, and a Duration field (920) may include time information for configuring a NAV or information related to an identifier (e.g., AID) of the user equipment.

Also, the RA field (930) includes address information of a receiving STA of the corresponding trigger frame and may be omitted if necessary. The TA field (940) includes address information of an STA triggering the corresponding trigger frame (for example, an AP), and the common information field (950) includes common control information applied to a receiving STA that receives the corresponding trigger frame. For example, a field indicating the length of the L-SIG field of the UL PPDU transmitted in response to the corresponding trigger frame or information controlling the content of the SIG-A field (namely, the HE-SIG-A field) of the UL PPDU transmitted in response to the corresponding trigger frame may be included. Also, as common control information, information on the length of the CP of the UP PPDU transmitted in response to the corresponding trigger frame or information on the length of the LTF field may be included.

Also, it is preferable to include a per user information field (960#1 to 960#N) corresponding to the number of receiving STAs that receive the trigger frame of FIG. 9. The per user information field may be referred to as an "RU allocation field".

Also, the trigger frame of FIG. 9 may include a padding field (970) and a frame check sequence field (980).

It is preferable that each of the per user information fields (960#1 to 960#N) shown in FIG. 9 includes a plurality of subfields.

Figure 10:
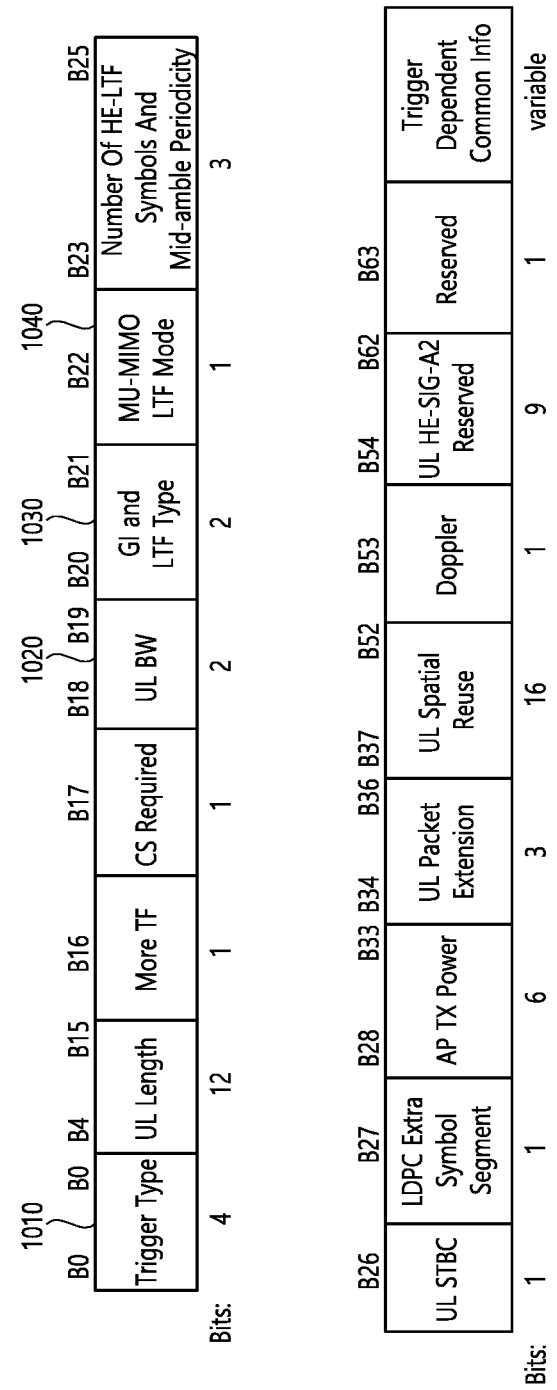
FIG. 10 illustrates an example of a common information field.

FIG. 10 illustrates an example of a common information field. Among the subfields of FIG. 10, some may be omitted, and other additional subfields may also be added. Additionally, the length of each of the subfields shown in the drawing may be varied.

The trigger type field (1010) of FIG. 10 may indicate a trigger frame variant and encoding of the trigger frame variant. The trigger type field (1010) may be defined as follows.

TABLE 4

| Trigger Type subfield value | Trigger frame variant |
| --- | --- |
| 0 | Basic |
| 1 | Beamforming Report Poll (BFRP) |
| 2 | MU-BAR |
| 3 | MU-RTS |
| 4 | Buffer Status Report Poll (BSRP) |
| 5 | GCR MU-BAR |
| 6 | Bandwidth Query Report Poll (BQRP) |
| 7 | NDP Feedback Report Poll (NFRP) |
| 8-15 | Reserved |

The UL BW field (1020) of FIG. 10 indicates bandwidth in the HE-SIG-A field of an HE Trigger Based (TB) PPDU. The UL BW field (1020) may be defined as follows.

TABLE 5

| UL BW subfield value | Description |
| --- | --- |
| 0 | 20 MHz |
| 1 | 40 MHz |
| 2 | 80 MHz |
| 3 | 80 + 80 MHz or 160 MHz |

The Guard Interval (GI) and LTF type fields (1030) of FIG. 10 indicate the GI and HE-LTF type of the HE TB PPDU response. The GI and LTF type field (1030) may be defined as follows.

TABLE 6

| GI And LTF field value | Description |
| --- | --- |
| 0 | 1x HE-LTF + 1.6 μs GI |
| 1 | 2x HE-LTF + 1.6 μs GI |
| 2 | 4x HE-LTF + 3.2 μs GI(#15968) |
| 3 | Reserved |

Also, when the GI and LTF type fields (1030) have a value of 2 or 3, the MU-MIMO LTF mode field (1040) of FIG. 10 indicates the LTF mode of a UL MU-MIMO HE TB PPDU response. At this time, the MU-MIMO LTF mode field (1040) may be defined as follows.

If the trigger frame allocates an RU that occupies the whole HE TB PPDU bandwidth and the RU is allocated to one or more STAs, the MU-MIMO LTF mode field (1040) indicates one of an HE single stream pilot HE-LTF mode or an HE masked HE-LTF sequence mode.

If the trigger frame does not allocate an RU that occupies the whole HE TB PPDU bandwidth and the RU is not allocated to one or more STAs, the MU-MIMO LTF mode field (1040) indicates the HE single stream pilot HE-LTF mode. The MU-MIMO LTF mode field (1040) may be defined as follows.

TABLE 7

| MU-MIMO LTF subfield value | Description |
| --- | --- |
| 0 | HE single stream pilot HE-LTF mode |
| 1 | HE masked HE-LTF sequence mode |

Figure 11:
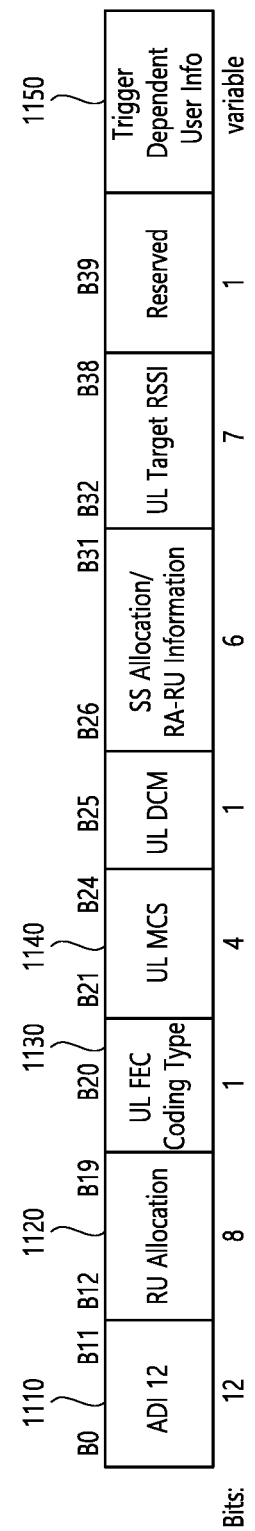
FIG. 11 illustrates an example of a subfield being included in a per user information field.

FIG. 11 illustrates an example of a subfield being included in a per user information field. Among the subfields of FIG. 11, some may be omitted, and other additional subfields may also be added. Additionally, the length of each of the subfields shown in the drawing may be varied.

The User Identifier field of FIG. 11 (or AID12 field, 1110) indicates the identifier of an STA (namely, a receiving STA) corresponding to per user information, where an example of the identifier may be the whole or part of the AID.

Also, an RU Allocation field (1120) may be included. In other words, when a receiving STA identified by the User Identifier field (1110) transmits a UL PPDU in response to the trigger frame of FIG. 9, the corresponding UL PPDU is transmitted through an RU indicated by the RU Allocation field (1120). In this case, it is preferable that the RU indicated by the RU Allocation field (1120) indicates the RUs shown in FIGS. 4, 5, and 6. A specific structure of the RU Allocation field (1120) will be described later.

The subfield of FIG. 11 may include a (UL FEC) coding type field (1130). The coding type field (1130) may indicate the coding type of an uplink PPDU transmitted in response to the trigger frame of FIG. 9. For example, when BCC coding is applied to the uplink PPDU, the coding type field (1130) may be set to '1', and when LDPC coding is applied, the coding type field (1130) may be set to '0'.

Additionally, the subfield of FIG. 11 may include a UL MCS field (1140). The MCS field (1140) may indicate an MCS scheme being applied to the uplink PPDU that is transmitted in response to the trigger frame of FIG. 9.

Also, the subfield of FIG. 11 may include a Trigger Dependent User Info field (1150). When the Trigger Type field (1010) of FIG. 10 indicates a basic trigger variant, the Trigger Dependent User Info field (1150) may include an MPDU MU Spacing Factor subfield (2 bits), a TID Aggregate Limit subfield (3 bits), a Reserved field (1 bit), and a Preferred AC subfield (2 bits).

Hereinafter, the present disclosure proposes an example of improving a control field included in a PPDU. The control field improved according to the present disclosure includes a first control field including control information required to interpret the PPDU and a second control field including control information for demodulate the data field of the PPDU. The first and second control fields may be used for various fields. For example, the first control field may be the HE-SIG-A (730) of FIG. 7, and the second control field may be the HE-SIG-B (740) shown in FIGS. 7 and 8.

Hereinafter, a specific example of improving the first or the second control field will be described.

In the following example, a control identifier inserted to the first control field or a second control field is proposed. The size of the control identifier may vary, which, for example, may be implemented with 1-bit information.

The control identifier (for example, a 1-bit identifier) may indicate whether a 242-type RU is allocated when, for example, 20 MHz transmission is performed. As shown in FIGS. 4 to 6, RUs of various sizes may be used. These RUs may be divided broadly into two types. For example, all of the RUs shown in FIGS. 4 to 6 may be classified into 26-type RUs and 242-type RUs. For example, a 26-type RU may include a 26-RU, a 52-RU, and a 106-RU while a 242-type RU may include a 242-RU, a 484-RU, and a larger RU.

The control identifier (for example, a 1-bit identifier) may indicate that a 242-type RU has been used. In other words, the control identifier may indicate that a 242-RU, a 484-RU, or a 996-RU is included. If the transmission frequency band in which a PPDU is transmitted has a bandwidth of 20 MHz, a 242-RU is a single RU corresponding to the full bandwidth of the transmission frequency band (namely, 20 MHz). Accordingly, the control identifier (for example, 1-bit identifier) may indicate whether a single RU corresponding to the full bandwidth of the transmission frequency band is allocated.

For example, if the transmission frequency band has a bandwidth of 40 MHz, the control identifier (for example, a 1-bit identifier) may indicate whether a single RU corresponding to the full bandwidth (namely, bandwidth of 40 MHz) of the transmission frequency band has been allocated. In other words, the control identifier may indicate whether a 484-RU has been allocated for transmission in the frequency band with a bandwidth of 40 MHz.

For example, if the transmission frequency band has a bandwidth of 80 MHz, the control identifier (for example, a 1-bit identifier) may indicate whether a single RU corresponding to the full bandwidth (namely, bandwidth of 80 MHz) of the transmission frequency band has been allocated. In other words, the control identifier may indicate whether a 996-RU has been allocated for transmission in the frequency band with a bandwidth of 80 MHz.

Various technical effects may be achieved through the control identifier (for example, 1-bit identifier).

First of all, when a single RU corresponding to the full bandwidth of the transmission frequency band is allocated through the control identifier (for example, a 1-bit identifier), allocation information of the RU may be omitted. In other words, since only one RU rather than a plurality of RUs is allocated over the whole transmission frequency band, allocation information of the RU may be omitted deliberately.

Also, the control identifier may be used as signaling for full bandwidth MU-MIMO. For example, when a single RU is allocated over the full bandwidth of the transmission frequency band, multiple users may be allocated to the corresponding single RU. In other words, even though signals for each user are not distinctive in the temporal and spatial domains, other techniques (for example, spatial multiplexing) may be used to multiplex the signals for multiple users in the same, single RU. Accordingly, the control identifier (for example, a 1-bit identifier) may also be used to indicate whether to use the full bandwidth MU-MIMO described above.

The common field included in the second control field (HE-SIG-B, 740) may include an RU allocation subfield. According to the PPDU bandwidth, the common field may include a plurality of RU allocation subfields (including N RU allocation subfields). The format of the common field may be defined as follows.

TABLE 8

| Subfield | Number of bits | Description |
|---|---|---|
| RU Allocation | N × 8 | Indicates the RU assignment to be used in the data portion in the frequency domain. It also indicates the number of users in each RU. For RUs of size greater than or equal to 106-tones that support MU-MIMO, it indicates the number of users multiplexed using MU-MIMO. Consists of N RU Allocation subfields:<br>N = 1 for a 20 MHz and a 40 MHz HE MU PPDU<br>N = 2 for an 80 MHz HE MU PPDU<br>N = 4 for a 160 MHz or 80 + 80 MHz HE MU PPDU |
| Center 26-tone RU | 1 | This field is present only if(#15510) the value of the Bandwidth field of HE-SIG-A field in an HE MU PPDU is set to greater than 1.<br>If the Bandwidth field of the HE-SIG-A field in an HE MU PPDU is set to 2, 4 or 5 for 80 MHz:<br>Set to 1 to indicate that a user is allocated to the center 26-tone RU (see FIG. 28-7 (RU locations in an 80 MHz HE PPDU(#16528))); otherwise, set to 0. The same value is applied to both HE-SIG-B content channels.<br>If the Bandwidth field of the HE-SIG-A field in an HE MU PPDU is set to 3, 6 or 7 for 160 MHz or 80 + 80 MHz:<br>For HE-SIG-B content channel 1, set to 1 to indicate that a user is allocated to the center 26-tone RU of the lower frequency 80 MHz; otherwise, set to 0.<br>For HE-SIG-B content channel 2, set to 1 to indicate that a user is allocated to the center 26-tone RU of the higher frequency 80 MHz; otherwise, set to 0. |
| CRC | 4 | See 28.3.10.7.3 (CRC computation) |
| Tail | 6 | Used to terminate the trellis of the convolutional decoder. Set to 0 |

The RU allocation subfield included in the common field of the HE-SIG-B may be configured with 8 bits and may indicate as follows with respect to 20 MHz PPDU bandwidth. RUs to be used as a data portion in the frequency domain are allocated using an index for RU size and disposition in the frequency domain. The mapping between an 8-bit RU allocation subfield for RU allocation and the number of users per RU may be defined as follows.

TABLE 9

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 | 52 | | 1 |
| 00000010 | 26 | 26 | 26 | 26 | 26 | 52 | | 26 | 26 | 1 |
| 00000011 | 26 | 26 | 26 | 26 | 26 | 52 | | 52 | | 1 |
| 00000100 | 26 | 26 | 52 | | 26 | 26 | 26 | 26 | 26 | 1 |
| 00000101 | 26 | 26 | 52 | | 26 | 26 | 26 | 52 | | 1 |
| 00000110 | 26 | 26 | 52 | | 26 | 52 | | 26 | 26 | 1 |
| 00000111 | 26 | 26 | 52 | | 26 | 52 | | 52 | | 1 |
| 00001000 | 52 | | 26 | 26 | 26 | 26 | 26 | 26 | 26 | 1 |
| 00001001 | 52 | | 26 | 26 | 26 | 26 | 26 | 52 | | 1 |
| 00001010 | 52 | | 26 | 26 | 26 | 52 | | 26 | 26 | 1 |
| 00001011 | 52 | | 26 | 26 | 26 | 52 | | 52 | | 1 |
| 00001100 | 52 | | 52 | | 26 | 26 | 26 | 26 | 26 | 1 |
| 00001101 | 52 | | 52 | | 26 | 26 | 26 | 52 | | 1 |
| 00001110 | 52 | | 52 | | 26 | 52 | | 26 | 26 | 1 |
| 00001111 | 52 | | 52 | | 26 | 52 | | 52 | | 1 |
| 00010$y_2y_1y_0$ | 52 | | 52 | | | — | | 106 | | 8 |
| 00011$y_2y_1y_0$ | | 106 | | | — | | 52 | | 52 | 8 |
| 00100$y_2y_1y_0$ | 26 | 26 | 26 | 26 | 26 | | 106 | | | 8 |
| 00101$y_2y_1y_0$ | 26 | 26 | 52 | | 26 | | 106 | | | 8 |
| 00110$y_2y_1y_0$ | 52 | | 26 | 26 | 26 | | 106 | | | 8 |
| 00111$y_2y_1y_0$ | 52 | | 52 | | 26 | | 106 | | | 8 |
| 01000$y_2y_1y_0$ | | 106 | | | 26 | 26 | 26 | 26 | 26 | 8 |
| 01001$y_2y_1y_0$ | | 106 | | | 26 | 26 | 26 | 52 | | 8 |
| 01010$y_2y_1y_0$ | | 106 | | | 26 | 52 | | 26 | 26 | 8 |
| 01011$y_2y_1y_0$ | | 106 | | | 26 | 52 | | 52 | | 8 |
| 0110$y_1y_0z_1z_0$ | | 106 | | | — | | 106 | | | 16 |
| 01110000 | 52 | | 52 | | — | | 52 | | 52 | 1 |
| 01110001 | colspan="9" 242-tone RU empty | | | | | | | | | 1 |
| 01110010 | colspan="9" 484-tone RU with zero User fields indicated in this RU Allocation subfield of the HE-SIG-B content channel | | | | | | | | | 1 |
| 01110011 | colspan="9" 996-tone RU with zero User fields indicated in this RU Allocation subfield of the HE-SIG-B content channel | | | | | | | | | 1 |
| 011101$x_1x_0$ | Reserved | | | | | | | | | 4 |
| 01111$y_2y_1y_0$ | Reserved | | | | | | | | | 8 |

TABLE 9-continued

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| $10y_2y_1y_0z_2z_1z_0$ | | 106 | | 26 | | 106 | | | | 64 |
| $11000y_2y_1y_0$ | | | | 242 | | | | | | 8 |
| $11001y_2y_1y_0$ | | | | 484 | | | | | | 8 |
| $11010y_2y_1y_0$ | | | | 996 | | | | | | 8 |
| $11011y_2y_1y_0$ | | | | Reserved | | | | | | 8 |
| $111x_4x_3x_2x_1x_0$ | | | | Reserved | | | | | | 32 |

If(#Ed) signaling RUs of size greater than 242 subcarriers, $y_2y_1y_0$ = 000-111 indicates number of User fields in the HE-SIG-B content channel that contains the corresponding 8-bit RU Allocation subfield. Otherwise, $y_2y_1y_0$ = 000-111 indicates number of STAs multiplexed in the 106-tone RU, 242-tone RU or the lower frequency 106-tone RU if there are two 106-tone RUs and one 26-tone RU is assigned between two 106-tone RUs. The binary vector $y_2y_1y_0$ indicates $2^2 \times y_2 + 2^1 \times y_1 + y_0 + 1$ STAs multiplexed the RU.
$z_2z_1z_0$ = 000-111 indicates number of STAs multiplexed in the higher frequency 106-tone RU if there are two 106-tone RUs and one 26-tone RU is assigned between two 106-tone RUs. The binary vector $z_2z_1z_0$ indicates $2^2 \times z_2 + 2^1 \times z_1 + z_0 + 1$ STAs multiplexed in the RU.
Similarly, $y_1y_0$ = 00-11 indicates number of STAs multiplexed in the lower frequency 106-tone RU. The binary vector $y_1y_0$ indicates $2^1 \times y_1 + y_0 + 1$ STAs multiplexed in the RU.
Similarly, $z_1z_0$ = 00-11 indicates the number of STAs multiplexed in the higher frequency 106-tone RU. The binary vector $z_1z_0$ indicates $2^1 \times z_1 + z_0 + 1$ STAs multiplexed in the RU.
1 to #9 (from left to the right) is ordered in increasing order of the absolute frequency.
$x_1x_0$ = 00-11, $x_4x_3x_2x_1x_0$ = 00000-11111.
'—' means no STA in that RU.

The user-specific field included in the second control field (HE-SIG-B, 740) may include a user field, a CRC field, and a Tail field. The format of the user-specific field may be defined as follows.

TABLE 10

| Subfield | Number of bits | Description |
|---|---|---|
| User field | N × 21 | The User field format for a non-MU-MIMO allocation is defined in Table 28-26 (User field format for a non-MU-MIMO allocation). The User field format for a MU-MIMO allocation is defined in Table 28-27 (User |

TABLE 10-continued

| Subfield | Number of bits | Description |
|---|---|---|
| | | field for an MU-MIMO allocation).<br>N = 1 if it is the last User Block field, and if there is only one user in the last User Block field.<br>N = 2 otherwise |
| CRC | 4 | The CRC is calculated over bits 0 to 20 for a User Block field that contains one User field, and bits 0 to 41 for a User Block field that contains two User fields. See 28.3.10.7.3 (CRC computation). |
| Tail | 6 | Used to terminate the trellis of the convolutional decoder. Set to 0. |

Also, the user-specific field of the HE-SIG-B is composed of a plurality of user fields. The plurality of user fields are located after the common field of the HE-SIG-B. The location of the RU allocation subfield of the common field and that of the user field of the user-specific field are used together to identify an RU used for transmitting data of an STA. A plurality of RUs designated as a single STA are now allowed in the user-specific field. Therefore, signaling that allows an STA to decode its own data is transmitted only in one user field.

As an example, it may be assumed that the RU allocation subfield is configured with 8 bits of 01000010 to indicate that five 26-tone RUs are arranged next to one 106-tone RU and three user fields are included in the 106-tone RU. At this time, the 106-tone RU may support multiplexing of the three users. This example may indicate that eight user fields included in the user-specific field are mapped to six RUs, the first three user fields are allocated according to the MU-MIMO scheme in the first 106-tone RU, and the remaining five user fields are allocated to each of the five 26-tone RUs.

User fields included in the user-specific field of the HE-SIG-B may be defined as described below. Firstly, user fields for non-MU-MIMO allocation are as described below.

TABLE 12

| Bit | Subfield | Number of bits | Description |
|---|---|---|---|
| B0-B10 | STA-ID | 11 | Set to a value of the element indicated front TXVECTOR parameter STA_ID_LISE (see 27.11.1 (STA_ID_LIST)). |
| B11-B13 | NSTS | 3 | Number of space-time streams.<br>Set to the number of space-time streams minus 1. |
| B14 | Beamformed (#16038) | 1 | Use of transmit beamforming.<br>Set to 1 if a beamforming steering matrix is applied to the waveform in an SU transmission.<br>Set to 0 otherwise. |
| B15-B18 | MCS | 4 | Modulation and coding scheme<br>Set to n for MCSn, where n = 0, 1, 2, . . . , 11<br>Values 12 to 15 are reserved |
| B19 | DCM | 1 | Indicates whether or not DCM is used.<br>Set to 1 to indicate that the payload(#Ed) of the corresponding user of the HE MU PPDU is modulated with DCM for the MCS.<br>Set to 0 to indicate that the pay load of the corresponding user of the PPDU is not modulated with DCM for the MCS.<br>NOTE-DCM is not applied in combination with STBC. (#15664) |
| B20 | Coding | 1 | Indicates whether BCC or LDPC is used.<br>Set to 0 for BCC<br>Set to 1 for LDPC |

NOTE-
If the STA-ID subfield is set to 2046, then the other subfields can be set to arbitrary values. (#15946)

User fields for MU-MIMO allocation are as described below.

TABLE 13

| Bit | Subfield | Number of bits | Description |
|---|---|---|---|
| B0-B10 | STA-ID | 11 | Set to a value of element indicated from TXVECTOR parameter STA ID LIST (see 27.11.1 (STA_ID_LIST)). |
| B11-B14 | Spatial Configuration | 4 | Indicates the number of spatial streams for a STA in an MU-MIMO allocation (see Table 28-28 (Spatial Configuration subfield encoding)). |
| B15-B18 | MCS | 4 | Modulation and coding scheme. Set to n for MCSn, where n = 0, 1, 2, . . . , 11 Values 12 to 15 are reserved |
| B19 | Reserved | 1 | Reserved aid set to 0 |
| B20 | Coding | 1 | Indicates whether BCC or LDPC is used. Set to 0 for BCC Set to 1 for LDPC |

NOTE-
If the STA-ID subfield is set to 2046, then the other subfields can be set to arbitrary values. (#15946)

Figure 12:
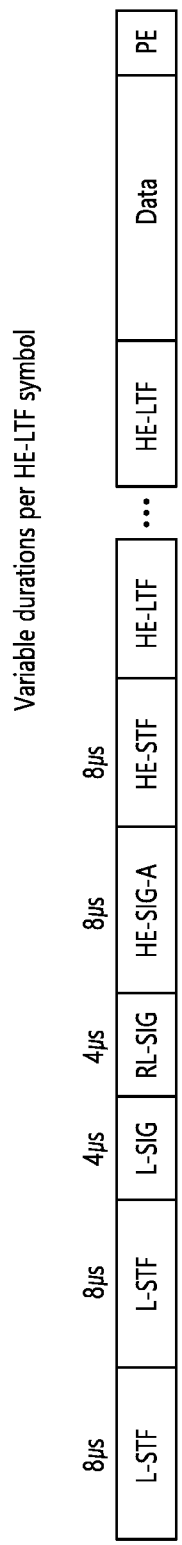
FIG. 12 illustrates one example of an HE TB PPDU.

FIG. 12 illustrates an example of an HE TB PPDU. The PPDU of FIG. 12 illustrates an uplink PPDU transmitted in response to the trigger frame of FIG. 9. At least one STA receiving a trigger frame from an AP may check the common information field and the individual user information field of the trigger frame and may transmit a HE TB PPDU simultaneously with another STA which has received the trigger frame.

As shown in the figure, the PPDU of FIG. 12 includes various fields, each of which corresponds to the field shown in FIGS. 2, 3, and 7. Meanwhile, as shown in the figure, the HE TB PPDU (or uplink PPDU) of FIG. 12 may not include the HE-SIG-B field but only the HE-SIG-A field.

Although a PHY transmit/receive procedure in Wi-Fi may have different detailed packet configuration methods, the PHY transmit/receive procedure will be described as follows. For simplicity, although examples will only be presented for 11n and 11ax, 11g/ac also follows a similar procedure.

That is, in a PHY transmit procedure, when a MAC protocol data unit (MPDU) or Aggregate MPDU (A-MPDU) arrives at a MAC end, the MPDU or A-MPDU are converted to a Single PHY service data unit (PSDU), at a PHY end, and then transmitted after inserting a Preamble, Tail bits, and padding bits (if needed). This is referred to as a PPDU.

Generally, a PHY receive procedure is as described below. When energy detection and preamble detection (L/HT/VHT/HE-preamble detection per Wi-Fi version) are performed, information on a PSDU configuration is obtained (or acquired) from a PHY header (L/HT/VHT/HE-SIG), and, then, a MAC header is read, and data is read.

Hereinafter, a transmission of PPDU having preamble puncturing (i.e., a preamble punctured PPDU transmission) will be described in detail.

Preamble puncturing may be signaled by a Bandwidth field of an HE-SIG-A field of an HE MU PPDU (see Table 2).

More specifically, a transmitting device transmits an HE MU PPDU together with preamble puncturing in 80 MHz. At this point, in case a primary 20 MHz channel and a secondary 40 MHz channel are idle during a PIFS duration immediately before starting a TXOP (i.e., a TXOP start), the preamble is punctured only in the secondary 20 MHz channel (in a case where the Bandwidth field is set to 4).

Additionally, a transmitting device transmits an HE MU PPDU together with preamble puncturing in 80 MHz. At this point, in case a primary 20 MHz channel, a secondary 20 MHz channel, and one of two 20 MHz subchannels of a secondary 40 MHz channel are idle during a PIFS duration immediately before starting a TXOP (i.e., a TXOP start), the preamble is punctured only in one of the two 20 MHz subchannels of the secondary 40 MHz channel (in a case where the Bandwidth field is set to 5).

Additionally, a transmitting device transmits an HE MU PPDU together with preamble puncturing in 160 MHz or 80+80 MHz. At this point, in case a primary 20 MHz channel, a secondary 20 MHz channel, and at least one of four 20 MHz subchannels of a secondary 80 MHz channel are idle during a PIFS duration immediately before starting a TXOP (i.e., a TXOP start), a primary 80 MHz of the preamble is punctured only in the secondary 20 MHz channel (in a case where the Bandwidth field is set to 6).

Additionally, a transmitting device transmits an HE MU PPDU together with preamble puncturing in 160 MHz or 80+80 MHz. At this point, in case a primary 20 MHz channel, a secondary 20 MHz channel, and at least one of four 20 MHz subchannels of a secondary 80 MHz channel are idle during a PIFS duration immediately before starting a TXOP (i.e., a TXOP start), a primary 80 MHz of the preamble exists only in a primary 40 MHz channel (in a case where the Bandwidth field is set to 7).

A process of receiving, by an HE STA, a preamble punctured HE PPDU having a Bandwidth field within an HE-SIG-A being set to 4 to 7 is optional. It is shown that an HE STA may receive a preamble punctured HE PPDU having a Bandwidth field within an HE-SIG-A being set to 4 to 7 by using a Punctured Preamble Rx subfield within an HE PHY Capabilities Information field of an HE Capabilities field.

1. Embodiments Applicable to the Present Disclosure

In a WLAN system, an STA may transmit a signal by using a wide bandwidth (e.g., 80 MHz, 160 MHz). However, in case a 20 MHz channel within the wide bandwidth is busy, the whole (or full) band may not be used due to the one 20 MHz channel that is busy. Or, since a signal is transmitted by using only idle channels, such as 20 MHz or 40 MHz, and so on, the efficiency in the channel usage is not good.

Additionally, since a signal is transmitted by allocating only one channel or band to an STA, in a case where the wide bandwidth cannot be used, it is difficult to provide a high throughput. Therefore, this specification proposes a method for transmitting/receiving a signal by using bonding for a non-continuous channel band (i.e., non-continuous channel bonding (NCCB)) within a band in order to easily perform a wide bandwidth transmission of an STA, so as to increase channel efficiency of the WLAN system and to enhance throughput for an STA.

Figure 13:
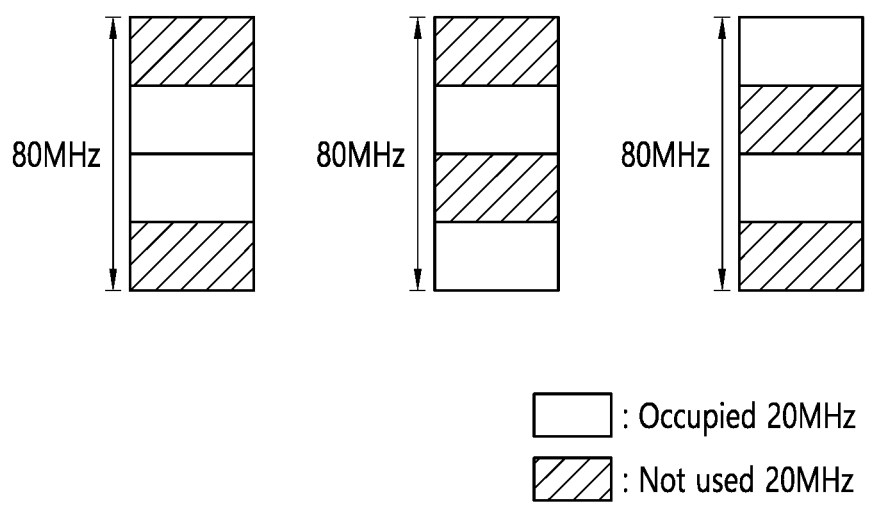
FIG. 13 illustrates an NCCB combination of 40 MHz within an 80 MHz band.

FIG. 13 illustrates an NCCB combination of 40 MHz within an 80 MHz band.

Figure 14:
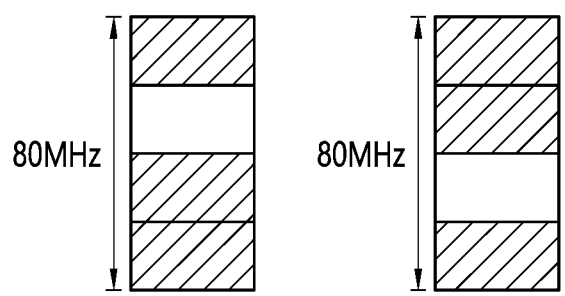
FIG. 14 illustrates an NCCB combination of 60 MHz within an 80 MHz band.

FIG. 14 illustrates an NCCB combination of 60 MHz within an 80 MHz band.

Proposed herein is a method for allocating multiple bands or channels to one STA, in order to provide a high throughput by using a wide bandwidth, and transmitting a WLAN signal by bonding the allocated channels or bands. At this point, one or more channels and bands are being allocated to an STA and the channels and bands are not adjacent to each other. For example, in 80 MHz, NCCB may use a channel combination, as shown in FIG. 13 and FIG. 14, in accordance with the bandwidth size. And, at this point, the channel may exist in various positions within 80 MHz.

In a WLAN bandwidth (i.e., 2.4 GHz and 5 GHz), in order to transmit a signal by using NCCB, which uses a channel being configured as shown in FIG. 13 and FIG. 14, an AP and STA may verify whether or not NCCB can be supported, by using a PHY capability information field when performing association or negotiation, and the PHY capability information field for NCCB may be configured as shown in FIG. 15.

FIG. 15 illustrates an exemplary format of a PHY capability information field for performing NCCB.

Referring to FIG. 15, NCCB support is an indication for defining whether or not NCCB can be supported. And, in case NCCB is supported, the above-mentioned field is set to 1, and, otherwise, the corresponding field is set to 0.

As shown in FIG. 15, a PHY capability field is configured by adding a capability field for supporting NCCB. And, at this point, in accordance with the addition of an NCCB support field to the capability field, the encoding and definition of its subsequent (or following) fields (i.e., channel width set and punctured preamble RX fields) may be defined as described below. That is, it may be known that not only the information indicating the existing continuous channel(s) but also information indicating non-continuous channel(s) are included in the Channel width set field of FIG. 15.

B0 for support for a continuous 40 MHz channel width in 2.4 GHz

B1 for support for a non-continuous 40 MHz in 80 MHz width in 2.4 GHz

B2 for support for a non-continuous 60 MHz in 80 MHz width in 2.4 GHz

B3 for support for a continuous 40 MHz and 80 MHz channel width in 5 GHz

B4 for support for a non-continuous 40 MHz in 80 MHz width in 5 GHz

B5 for support for a non-continuous 60 MHz in 80 MHz width in 5 GHz

B6 for support for 242-tone RUs in a 40 MHz HE MU PPDU in the 2.4 GHz

B7 for support for 242-tone RUs in a 40 MHz and 80 MHz HE MU PPDU in the 5 GHz

B8 for support for 242-tone RUs in a 40 MHz, 80 MHz, 160 MHz, 80+80 MHz HE MU PPDU in the 5 GHz B9 for support for a non-continuous 80 MHz in 160 MHz width in 5 GHz B10 for support for a non-continuous 100 MHz in 160 MHz width in 5 GHz B11 for support for a non-continuous 120 MHz in 160 MHz width in 5 GHz B12 for support for a non-continuous 140 MHz in 160 MHz width in 5 GHz B13 for support for a non-continuous 40 MHz in 80 MHz width in 5 GHz B14 for support for a non-continuous 60 MHz in 80 MHz width in 5 GHz B15 for support for a non-continuous 80 MHz in 160 MHz width in 5 GHz B16 for support for a non-continuous 100 MHz in 160 MHz width in 5 GHz B17 for support for a non-continuous 120 MHz in 160 MHz width in 5 GHz B18 for support for a non-continuous 140 MHz in 160 MHz width in 5 GHz Additionally, in case a signal is transmitted by using a non-continuous channel, a Punctured Preamble Rx field, which indicates whether or not a preamble reception of a non-continuous channel is being supported, is configured of 6 bits, and, by using the bit information, the preamble of a non-continuous channel that can be received by the STA is indicated by using the following method.

B0 for support for the reception of an 80 MHz preamble where one 20 MHz subchannel is punctured B1 for support for the reception of an 80 MHz preamble where the two 20 MHz subchannels is punctured B2 for support for the reception of a 160 MHz preamble where the one 20 MHz subchannels is punctured B3 for support for the reception of a 160 MHz preamble where the two 20 MHz subchannels is punctured B4 for support for the reception of a 160 MHz preamble where the three 20 MHz subchannels is punctured B5 for support for the reception of a 160 MHz preamble where the four 20 MHz subchannels is punctured Bits being allocated for the Channel width set and Punctured Preamble RX fields within the PHY capability field for NCCB are merely exemplary. Therefore, for various future extensions, other various numbers of bits may be allocated and used.

The AP may verify whether or not a non-continuous channel of an STA can be supported by using the PHY capability field information. The AP may use a numerology of OFDMA of 11ax in order to transmit/receive signals by bonding a non-continuous channel to an STA supporting NCCB. And, the non-continuous channel bonding may be performed by using the methods described below.

2. Proposed Embodiments 2.1. Method for Transmitting/Receiving a Signal via NCCB by Determining a Channel with Using RTS/CTS A. In order to prevent channel access by another STA/AP to the channel transmitting/receiving the signal, and in order to prevent interference on a signal transmission, before performing signal transmission/reception, the STA and AP transmit Request to Send (RTS)/Clear to Send (CTS) frame(s). Therefore, by using the RTS/CTS frame, which is transmitted before transmitting/receiving a signal by using NCCB, information on a channel width for NCCB may be transmitted/received.

Figure 16:
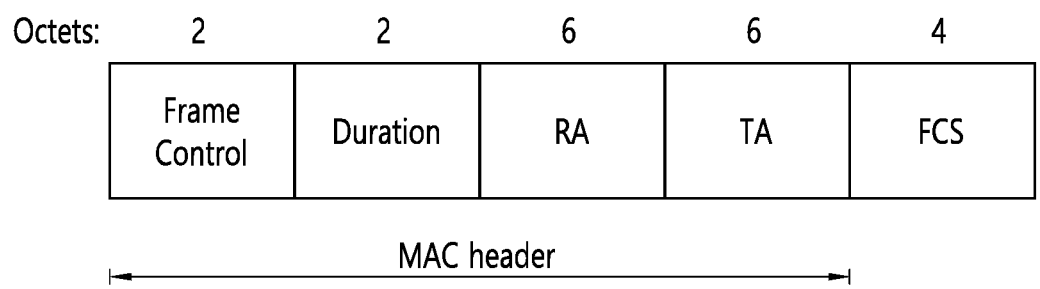
FIG. 16 illustrates an exemplary format of an RTS frame.

B. FIG. 16 illustrates an exemplary format of an RTS frame. An RTS frame format is as shown in FIG. 16, and a TA field value of the frame may indicate ID information of the STA transmitting the RTS frame or bandwidth information on the bandwidth through which the RTS frame is being transmitted. When transmitting the information on the bandwidth, the above-described value is determined by using a CH_BANDWIDTH value of TXVECTOR parameters. Therefore, in order to perform NCCB, the AP/STA transmits an RTS by including the RTS in Channel width information for NCCB and by using the corresponding channel.

C. Bandwidth info for TA fields on NCCB

Bandwidths for NCCB are defined in the TA field as shown below.

TABLE 14

| Number of indication | Description |
| --- | --- |
| 0~2 | Possible 40 MHz in 80 MHz |
| 3~4 | Possible 60 MHz in 80 MHz |
| 5~34 | Possible 80 MHz in 160 MHz |
| 35~49 | Possible 100 MHz in 160 MHz |
| 50~62 | Possible 120 MHz in 160 MHz |
| 63~68 | Possible 140 MHz in 160 MHz |

C-i. As shown in Table 14, by loading the channel information for NCCB in an RTS and by transmitting the RTS, another device receiving the RTS may prevent channel access by configuring a NAV for the corresponding channel.

D. The STA/AP receiving the RTS transmits a CTS for the received RTS, and, at this point, information on a channel being available for usage, among the channels being received via RTS, is loaded in the CTS and then transmitted to the AP/STA.

E. The signal is transmitted by performing channel bonding using the channel information received through the CTS.

F. By performing NCCB using RTS/CTS, channel access and signal transmission of an unintended STA/AP adjacent to TX/RX may be prevented. Thus, influence caused by interference occurring during signal transmission/reception may be reduced.

2.2. Method for Using a Trigger Frame for Transmitting NCCB

A. Similarly to transmitting information that is needed for UL transmission by using a trigger frame for UL transmission in 11ax, the AP transmits a trigger frame to an STA, and the STA receiving the transmitted trigger frame may determine NCCB information (e.g., channel allocation) through the received trigger frame. The channel information on bonding and the information on signal reception may be determined by using the received information.

B. The NCCB transmission procedure using a trigger frame is as follows.

Figure 17:
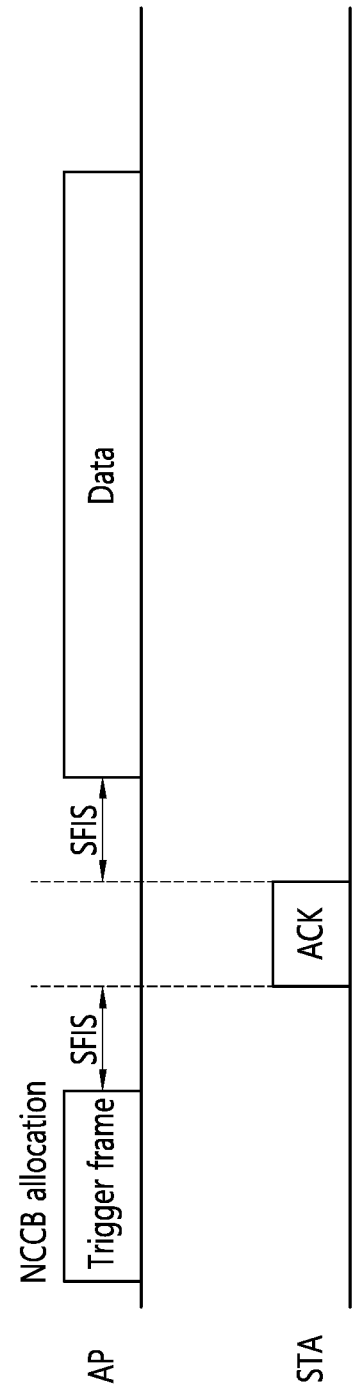
FIG. 17 illustrates an NCCB transmission procedure using a trigger frame.

FIG. 17 illustrates an NCCB transmission procedure using a trigger frame.

B-i. An AP transmits a trigger frame including NCCB allocation information and information on an STA in order to transmit a signal to a single STA via NCCB. And, the STA receiving the NCCB trigger frame transmits an ACK for the received trigger frame or transmits a response to the received frame. After receiving the ACK/response frame being transmitted from the STA, the AP transmits a signal via channel bonding.

B-ii. In FIG. 17, after transmitting the trigger frame for NCCB transmission, although it is considered to transmit an ACK/response after an SIFS, in order to reduce NCCBT (i.e., non-continuous channel bonding transmission) overhead, after transmitting the trigger frame, the AP may immediately perform channel bonding so as to transmit data to the STA.

B-iii. As shown in FIG. 17, the trigger frame being transmitted by the AP for NCCB is configured by using a trigger frame of 11ax, and, at this point, the trigger frame includes information as shown in FIG. 9 and FIG. 10.

A common field of the trigger frame is configured as shown in FIG. 10, and, in order to perform indication of the NCCB by using the trigger frame, information on NCCB (Trigger type subfield=8, NCCBRP) is added to a trigger type of a common info field. Thus, a trigger type field is configured as shown below in the following table.

TABLE 15

| Trigger type subfield | Trigger frame variant |
| --- | --- |
| 0 | Basic |
| 1 | Beamforming report poll(BRP) |
| 2 | MU-BAR |
| 3 | MU-RTS |
| 4 | Buffer status reports poll (BSRP) |
| 5 | GCR MU-BAR |
| 6 | Bandwidth Query Report Poll (BQRP) |
| 7 | NDP Feedback Report Poll (NFRP) |
| 8 | Non continuous channel bonding report poll (NCCBRP) |
| 9~15 | Reserved |

Additionally, in order to indicate whether the transmission using NCCB is a DL transmission or a UL transmission, 1 bit of B63 reserved in the common field is used so as to indicate the operation of the STA after receiving the trigger frame. For example, as shown in Table 15, in case the trigger type field within the common field indicates 8, the bit of B63 indicates the following information.

B-1. Trigger type subfield==8 & B63==1

B-1-A. If the last bit (B63) of the common field and the trigger type are described as mentioned above, this indicates that the transmission is a DL transmission using NCCB. That is, in case the trigger type indicates NCCB, as described above, since the information being transmitted through the trigger frame is information for UL transmission by an STA for performing transmission to the AP (i.e., transmission information for TB PPDU), the remaining fields excluding the above-mentioned field may be reserved.

B-1-B. Additionally, a user info field of the trigger frame may be configured by including information on one STA or may be configured by creating an identical user info field for each of the allocated channels/bands being used for NCCB. And, at this point, an STA ID is identically configured in each user field.

B-1-C. Since the usage or non-usage of other information is determined by a Trigger type subfield and an NCCB indication field (e.g., B63), the common info field may be configured so that the NCCB indication field (1 bit) is positioned after the Trigger type subfield. And, at this point, in case of DL, if the NCCB indication field is set to 1, the remaining fields may be reserved.

B-1-D. Channel allocation information for NCCB may be indicated by using an RU allocation field of the user field, and, since the transmission is a DL transmission for a single STA, in the user info field (see FIG. 11), the fields following the RU allocation field may be reserved.

B-2. Trigger type subfield==8 & B63==0

B-2-A. This indicates UL transmission using NCCB, and NCCB transmission via uplink (UL) by using TB PPDU information, which is received through the trigger frame.

B-3. Additionally, the trigger frame for NCCB transmission includes user info for one STA, and, at this point, channel information being used for NCCB may be indicated by using an RU allocation field of the user field (see FIG. 11).

B-3-A. The channel information being used for NCCB is indicated by using the RU allocation field in the user field, and the channel information being transmitted through the RU allocation field may notify information on a channel being used for NCCB by using values of B13~B19. The table shown below indicates information of a channel being used for NCCB, which is indicated by B13-B19 of the RU Allocation subfield.

TABLE 16

| B13-B19 | Description |
| --- | --- |
| 0~2 | Possible 40 MHz in 80 MHz |
| 3~4 | Possible 60 MHz in 80 MHz |
| 5~34 | Possible 80 MHz in 160 MHz |
| 35~49 | Possible 100 MHz in 160 MHz |
| 50~62 | Possible 120 MHz in 160 MHz |
| 63~68 | Possible 140 MHz in 160 MHz |
| 69~127 | Reserved |

According to Table 16, the number of cases of channels having NCCB performed therein in a full 80 MHz bandwidth is equal to 5 (0~4), and the number of cases of channels having NCCB performed therein in a full 160 MHz bandwidth is equal to 64 (5~68).

In case AID12 is not equal to 0 or 2045, in order to indicate the NCCB of 80 MHz, B12 is set to 0, and, in order to indicate the NCCB of 160 MHz, B12 is set to 1.

In case of using a trigger frame for DL NCCB transmission, although it is disadvantageous in that the transmission overhead increases due to the transmission of the trigger frame and the reception of its response, when performing transmission to a single STA through a wide bandwidth by using NCCB, since there is no need to define a new PPDU format, the NCCB may be performed by using a previously defined SU PPDU.

1. In case of using a trigger frame transmission, since information on the channel has already been transmitted/received through the trigger frame, in case NCCB is performed by using SU PPDU via DL, the HE-SIG-A may be configured as shown in Table 1.

1-A. The NCCB transmission is indicated by using B14, which is reserved in HE-SIG-A (see Table 1) of an HE-SU-PPDU. And, at this point, the bit is set to 0.

1-B. If B14 is set to 0, a spatial reuse field is used for indicating the channel width information for NCCB, and the information that is being indicated is as shown below.

TABLE 17

| Value | Meaning |
| --- | --- |
| 0 | 40 MHz Non continuous channel in 80 MHz |
| 1 | 60 MHz Non continuous channel in 80 MHz |
| 2 | 80 MHz Non continuous channel in 160 MHz |
| 3 | 100 MHz Non continuous channel in 1600 MHz |
| 4 | 120 MHz Non continuous channel in 160 MHz |
| 5 | 140 MHz Non continuous channel in 160 MHz |
| 6~15 | Reserved |

According to the NCCB indication bit, the spatial reuse field of HE-SIG-A may be used as information on SRP or channel width information for NCCB.

1-C. Since information of BW being transmitted via NCCB is notified by using the spatial reuse field, if B14 is set to 0, the SRP operation is defined as being disallowed.

2.3. Method for Performing NCCB by Using an HE-SU PPDU Format

In case of performing NCCB by using a trigger frame, there is a disadvantage in that the transmission overhead increases when performing DL transmission. In order to resolve this problem, when performing NCCB, an HE-SU PPDU format may be used without performing any trigger frame transmission/reception. And, at this point, channel information for NCCB may be transmitted through a signal field. In order to transmit NCCB information by using the HE-SU PPDU format, the HE-SIG-A may be defined as follows.

i. HE-SIG-A content for an SU PPDU of 11ax is as follows, and a subfield for NCCB transmission may be defined as shown in Table 1.

1. DCM information, which is indicated by using B7 of a first symbol of the HE-SIG-A, is transmitted by using B14 of a second symbol, and B7~B12 are used for indicating BSS colors. And, B13 of the first symbol is used for indicating DL NCCB transmission, and, when performing NCCB transmission, by setting B13 to 1, the transmission is indicated as an NCCB transmission.

1-A. As described above, although NCCB may be indicated by using a reserved bit while considering an existing bit order, the reserved bit may also be used after performing reordering for the NCCB indication.

2. In order to indicate NCCB channel allocation information through an SIG-A, if B13 is set to 1, the bits corresponding to B14~B20 may be configured as described below in order to indicate the BW for NCCB transmission and channel allocation information.

2-A. B14: indication of BW for NCCB
  i. Set 0 for NCCB in 80 MHz
  ii. Set 1 for NCCB in 160 MHz 2-B. B15~B20: indication of channel allocation for NCCB
  i. By using a value for Binary 6 bits, this indicates channel allocation information of NCCB, which is transmitted by using 80 MHz and 160 MHz.
  i-1. The allocation information being transmitted through SIG-A includes information on the channel being allocated for channel bonding per 80/160 MHz, which is transmitted through the trigger frame as described above in 1.
  ii. The allocation information does not include allocation overlapping with the allocation corresponding to the existing preamble puncture.
  iii. Since the allocation information for NCCB is transmitted through the HE-SIG-A, there is no increase in the preamble overhead, and a separate SIG field is not needed for allocation.

2-C. Unlike using one bit for indicating a BW, which performs NCCB, as described above, channel allocation information for NCCB may be indicated by using all bits. For example, in case 7 bits are used, indication may be performed as shown below in the following table.

TABLE 18

| B15-B20 | Description |
| --- | --- |
| 0~2 | Possible 40 MHz in 80 MHz |
| 3~4 | Possible 60 MHz in 80 MHz |
| 5~34 | Possible 80 MHz in 160 MHz |
| 35~49 | Possible 100 MHz in 160 MHz |

TABLE 18-continued

| B15-B20 | Description |
| --- | --- |
| 50~62 | Possible 120 MHz in 160 MHz |
| 63~68 | Possible 140 MHz in 160 MHz |
| 69~127 | Reserved |

According to Table 18, the number of cases of channels having NCCB performed therein in a full 80 MHz bandwidth is equal to 5 (0~4), and the number of cases of channels having NCCB performed therein in a full 160 MHz bandwidth is equal to 64 (5~68).

Since information on a bandwidth is also transmitted together with the allocation information for the channel that can be used for NCCB, as compared to the above-described phased indication (i.e., indication performed by multiple phases), the number of bits needed for signaling may be reduced. Thus, the signaling overhead may be reduced.

When configuring the HE-SIG-A for NCCB, the given bit order is merely exemplary. And, therefore, the bit order may be variously defined in the above-mentioned information.

2.4. Method for Performing NCCB by Using an HE-MU PPDU Format

Unlike the description presented above, NCCB transmission for one STA may be performed by using an MU PPDU format for the NCCB transmission.

A. HE-SIG-A of an MU PPDU for NCCB may be configured as described below.

i. An 11ax HE-SIGA for MU-PPDU is configured as shown in Table 2, and, in case of transmitting a signal to one STA by using NCCB, an HE-SIG-A field may be configured as described below.

i-1. B0: This bit is used for indicating DL/UL, and, when performing NCCB transmission, this bit is set to 1.

i-2. B1: This bit is used as an identifier for the presence or absence of an NCCB transmission. And, when set to 0, this bit indicates 11ax MU transmission, and, when set to 1, this bit indicates a single user transmission using NCCB.

i-3. Since 1 bit is additionally used for NCCB indication, the bit order of the existing fields is pushed (or moved) backwards by one bit. For example, B2~15 are used for SIG-B MCS/SIG-B DCM/BSS color/spatial reuse field indication. However, this is merely exemplary, and each field may use various bit locations.

i-4. Additionally, if a Bandwidth field being indicated through B16~18 is set to 2, NCCB within 80 MHz is indicated, and if the Bandwidth field is set to 3, NCCB within 160 MHz is indicated. For example, if B1 is set to 1, value 2 indicating the BW means an NCCB operation BW (e.g., 40 MHz/60 MHz) within 80 MHz, and value 3 means an NCCB operation BW (e.g., 80/100/120/140 MHz) within 160 MHz (see Table 2).

i-5. Additionally, a Doppler indication being transmitted through a first HE-SIG-A symbol is relocated (or moved) to B7 of a second symbol so as to configure HE-SIG-A.

i-5-A. Since NCCB bonds several channels, signal distortion may be increased due to the influence caused by doppler. Therefore, in case of performing NCCB, the Doppler indication may be set to 0.

i-6. Additionally, since SIG-B compression is transmitted to one STA by using an MU PPDU, if NCCB is set to 1, the SIG-B compression shall be imperatively set to 0. If the SIG-B compression is set to 1, this indicates a full bandwidth MU-MIMO transmission, and the HE-SIG-B does not include a Common field and is configured only of a User Specific field. If the SIG-B compression is set to 0, this indicates an OFDMA transmission (wherein the RU is at least 20 MHz in NCCB) and not the full bandwidth MU-MIMO transmission, and the HE-SIG-B includes a Common field.

i-7. When performing NCCB by using MU PPDU, channel allocation information for NCCB is transmitted by using a common field of HE-SIG-B. At this point, for OFDMA allocation and commonality of 11ax, channel allocation for NCCB may be performed by using the existing RU based allocation. Additionally, since multiple RUs are being allocated to a single STA, the User field shown in Table 13 corresponding to each RU is set to have the same value so as to configure a user specific field. That is, the same STA_ID is inserted in the user field corresponding to each RU.

i-7-A. Since NCCB is performed by using a channel within 80 MHz/160 MHz, the RU allocation for such NCCB is configured by using an 8-bit allocation of HE-SIG-B, and channel allocation information is configured by using the following bits for each of 80 MHz/160 MHz. That is, the channel allocation information may be configured by using a reserved bit (see Table 9) of the 8-bit RU allocation information of 11ax. At this point, when the 8-bit RU allocation information indicates channel allocation of NCCB, although the RU allocation information may not indicate RU unit layout, the RU allocation information may indicate the layout of 20 MHz (or 242 RU), which is the smallest NCCB unit (see FIG. 13 and FIG. 14).

i. For example, in case of performing NCCB in 80 MHz, allocation configuring 40 MHz and 60 MHz is indicated by using 01111y2y1y0. That is, the number of cases of a channel, wherein NCCB is performed in an 80 MHz bandwidth (5 cases according to Table 16 and Table 18), may all be indicated.

ii. In case of 160 MHz, the channel allocation information is indicated by using 16 bits, and information on the channel is indicated by using 111x4x3x2x1x0, which is an 8-bit allocation for each 80 MHz. That is, the number of cases of a channel, wherein NCCB is performed in an 160 MHz bandwidth (64 cases according to Table 16 and Table 18), may all be indicated.

iii. In 11ax, a null subcarrier that is defined for OFDMA RU allocation is not needed when performing channel bonding. Therefore, an indicator for using a null subcarrier when performing channel bonding may be transmitted through an HE-SIG-B common field.

iii-1. The HE-SIG-B common field may be configured of channel allocation information for NCCB and an indicator for using a null subcarrier or tone allocation information for a null subcarrier.

i-8. In case of configuring a user field according to the allocation when performing NCCB, the HE-SIG-B is configured by repeating a same user field. However, since a signal is transmitted to only one STA, in case of configuring the HE-SIG-B according to the allocation, it is disadvantageous in that the overhead of the HE-SIG-B increases due to the repeated usage of the same user field. In order to reduce such overhead, if the NCCB is set to 1 in the HE-SIG-A, the user specific field of the HE-SIG-B may be configured of a user block field including only information on a single STA.

i-9. In order to transmit a signal to a single STA by using an MU PPDU via NCCB, the AP may use an ID that is determined for NCCB by allocating the ID to the STA. And, the ID that is determined for NCCB may be used instead of the STA_ID of a USER FIELD.

i-9-A. In order to perform ID allocation for the NCCB, a specific 12-bit STA_ID value, e.g., 4094, and so on, may be used.

B. For NCCB, unlike the above-described usage of a user specific field for MU-MIMO support, an NCCB using a user specific field for non-MU-MIMO support may be defined as shown in Table 12.

i. When performing NCCB, in order to use a Non-MU-MIMO user field, fields of the HE-SIG-A are configured as described below.

i-1. An NCCB indication field is included, and the NCCB operation is indicated by using this field.

i-2. BW information of NCCB is indicated by using a BW field.

i-3. By setting an SIG-B Compression field to 1, and by setting a number of MU-user to 0, indication that the HE-SIG-B is configured of a user field for one STA may be performed. That is, by setting the SIG-B Compression field of Table 2 to 1, the transmission is indicated as a full bandwidth MU-MIMO transmission. However, by indicating that the number of HE-SIG-B Symbols or the number of MU-MIMO Users is equal to 1 in the Number Of HE-SIG-B Symbols Or MU-MIMO Users field, the transmission may be indicated as a transmission for a single STA.

i-4. The NCCB indication is set to on (i.e., 1), and the SIG-B Compression field is set to 1, and the HE-SIG-B includes a common field. And, in this case, the common field includes channel allocation information for NCCB, information on a null subcarrier, and so on.

i-4-A. The channel allocation information may be indicated by using reserved bit information in an 11ax RU based allocation. For example, in case of performing NCCB in 80 MHz, allocation configuring 40 MHz and 60 MHz may be indicated by using 01111y2y1y0.

i-4-B. In case of 160 MHz, the channel allocation information is indicated by using 16 bits, and information on the channel is indicated by using 111x4x3x2x1x0, which is an 8-bit allocation for each 80 MHz.

C. In 11ax, unlike using the 8-bit allocation information according to the BW, the allocation information of the HE-SIG-B may be configured of 10 bits including the channel allocation information for NCCB. That is, this is an example of newly configuring the channel allocation information for NCCB with 10 bits without using the reserved bit (see Table 9) of the 8-bit RU allocation information of 11ax.

i. 10 bits for allocation include all allocation information for 20/40/80/160 MHz.

ii. In case of performing NCCB, when ordering channels in 20 MHz units, even order channel(s) and odd order channel(s) may not always be used simultaneously. In this case, when configuring the HE-SIB-G as in 11ax, the allocation information for some of the channels may be unknown. Therefore, by considering such channel bonding, the HE-SIG-B is configured by including information on all channels transmitting a signal, and such information may be duplicated in 20 MHz units and then transmitted.

Figure 18:
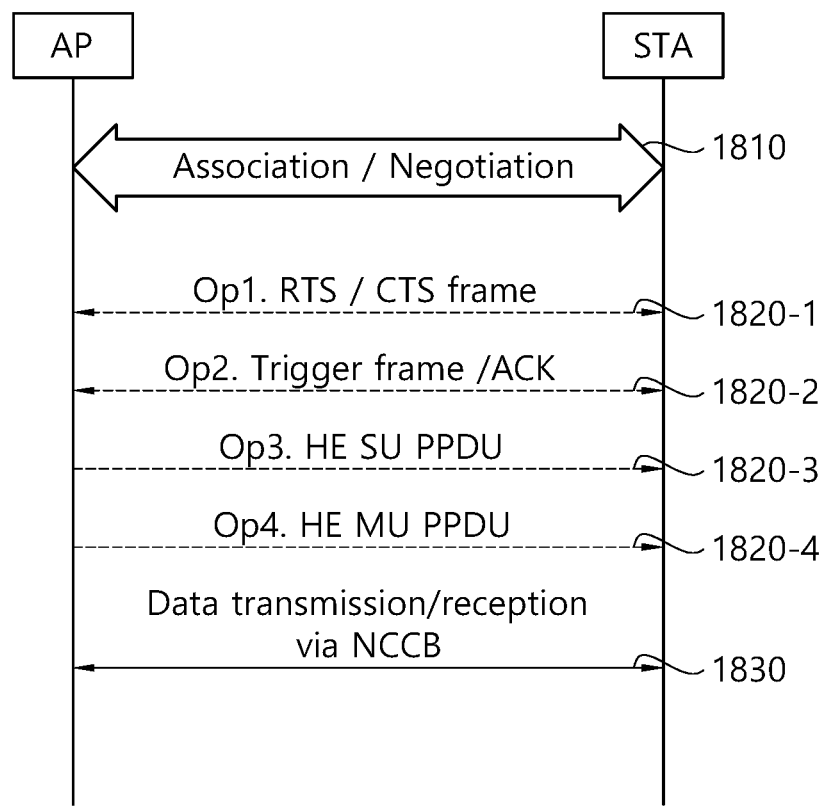
FIG. 18 is a diagram illustrating a procedure during which data is transmitted via NCCB according to an embodiment of the present disclosure.

FIG. 18 is a diagram illustrating a procedure during which data is transmitted via NCCB according to an embodiment of the present disclosure.

NCCB is a channel bonding scheme for transmitting/receiving data by bonding non-continuous channels (smallest unit of 20 MHz) in a wide bandwidth, such as 80 MHz or 160 MHz.

Referring to FIG. 18, in order to perform NCCB in a WLAN bandwidth, such as 2.4 GHz or 5 GHz, an AP and STA may first deliver (or transport) a PHY Capabilities Information field when performing Association/Negotiation.

The PHY Capabilities Information field may include information on whether or not NCCB is supported, a channel bandwidth, and whether or not a preamble reception of the NCCB is supported. The PHY Capabilities Information field has already been described above in detail with reference to FIG. 15.

Referring to FIG. 18, NCCB may be performed through four different methods of Op1 to Op4. The AP may perform NCCB through one of the methods of Op1 to Op4 of FIG. 18. That is, the AP may transmit a control signal, and so on, for transmitting/receiving data via NCCB by using a PPDU of one of Op1 to Op4 of FIG. 18.

As a first example (Op1), the AP may determine a channel bandwidth for NCCB by using an RTS/CTS frame and may then transmit/receive data (1820-1). The example of performing NCCB by using an RTS/CTS frame has already been described above in detail with reference to FIG. 16.

As a second example (Op2), the AP may perform NCCB by transmitting a trigger frame and by receiving an Ack from an STA (1820-2). The example of performing NCCB by using the trigger frame has already been described above in detail with reference to FIG. 17.

As a third example (Op3), the AP may perform NCCB by transmitting an HE SU PPDU without any trigger frame transmission/reception (1820-3).

As a fourth example (Op4), the AP may perform NCCB by transmitting an HE MU PPDU (1820-4).

The AP or STA may transmit/receive data via NCCB, which is determined based on a PPDU of one of Op1 to Op4 of FIG. 18 (1830).

Detailed description of the NCCB will hereinafter be described in detail with reference to FIG. 19 and FIG. 20.

Figure 19:
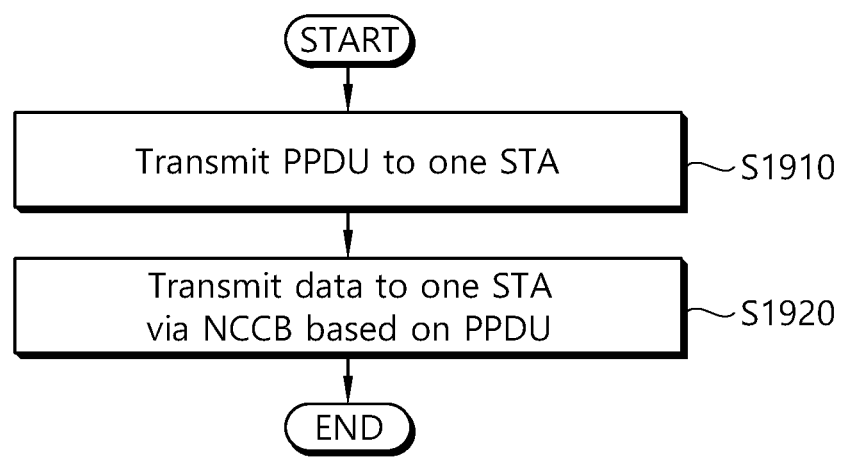
FIG. 19 is a flow chart illustrating a procedure for transmitting data via NCCB by an AP according to an embodiment of the present disclosure.

FIG. 19 is a flow chart illustrating a procedure for transmitting data via NCCB by an AP according to an embodiment of the present disclosure.

An example of FIG. 19 may be performed in a network environment supporting a next generation wireless LAN system. The next generation wireless LAN system is an improved wireless LAN system version of the 802.11ax system being capable of satisfying backward compatibility with the 802.11ax system.

Firstly, the terms will be defined. HE MU PPDU, HE-SIG-A field (first signal field), and HE-SIG-B field (second signal field) may all be PPDU and fields that are defined in the 802.11ax system. The PPDU and fields included in the PPDU that will hereinafter be described in detail may all be PPDU and fields being defined for performing NCCB in a next generation wireless LAN system. However, the PPDU and fields being defined for performing NCCB may be generated by using each subfield of the HE PPDU without any modification in order to satisfy backward compatibility with the 802.11ax system.

The example of FIG. 19 may be performed in a transmitting device, and the transmitting device may correspond to an access point (AP). A receiving device may correspond to a station (STA) (i.e., non-AP STA) having NCCB capability.

In S1910, an access point (AP) transmits a Physical layer Protocol Data Unit (PPDU) to one station (STA).

In S1920, data is transmitted to the one STA through a first Non-Continuous Channel Bonding (NCCB) bandwidth or a second NCCB bandwidth based on the PPDU.

The PPDU is a PPDU being used for NCCB transmission, and, therefore, the PPDU may be an RTS frame, a trigger frame, an HE SU PPDU, or an HE MU PPDU. However, in the embodiment that will hereinafter be described in detail, the PPDU will be limited to an HE MU PPDU and described accordingly. In case the PPDU is an RTS frame, trigger frame, or HE SU PPDU, the PPDU may operate identically as the PPDU of the above-described embodiment. The RTS frame, trigger frame, HE SU PPDU, or HE MU PPDU may be modified or newly defined in a next generation wireless LAN (WLAN) system.

The PPDU includes a first signal field and a second signal field. As described above, the PPDU may be generated by using a High Efficiency Multi User PPDU (HE MU PPDU). The first signal field may be related to an HE-SIG-A field, which is included in the HE MU PPDU. And, the second signal field may be related to an HE-SIG-B field, which is included in the HE MU PPDU. Since the second signal field is included, it may be known that the PPDU is a PPDU format that is based on HE MU PPDU.

The first NCCB bandwidth is a 40 MHz or 60 MHz bandwidth, which is generated by bonding non-continuous 20 MHz bandwidths within an 80 MHz bandwidth. That is, in case a full (or total) bandwidth is 80 MHz, the first NCCB bandwidth may generate a 40 MHz bandwidth or a 60 MHz bandwidth by bonding non-continuous 20 MHz bandwidths. In case of generating a 60 MHz bandwidth, specific 20 MHz bandwidths may be adjacent to one another. In the 80 MHz bandwidth, the number of cases where 40 MHz and 60 MHz bandwidths are generated by using NCCB may be equal to a total of 5 cases.

The second NCCB bandwidth is an 80 MHz, 100 MHz, 120 MHz, or 140 MHz bandwidth, which is generated by bonding non-continuous 20 MHz bandwidths within a 160 MHz bandwidth. That is, in case a full (or total) bandwidth is 160 MHz, the second NCCB bandwidth may generate an 80 MHz, a 100 MHz bandwidth, a 120 MHz bandwidth, or a 140 MHz bandwidth by bonding non-continuous 20 MHz bandwidths. In the 160 MHz bandwidth, the number of cases where 80 MHz, 100 MHz, 120 MHz, and 140 MHz bandwidths are generated by using NCCB may be equal to a total of 64 cases.

The first signal field includes first information and second information.

The first information is NCCB indication information on whether or not NCCB can be performed. For example, if the NCCB transmission can be performed, the NCCB indication information may be set to 1, and, if simply an MU transmission of 802.11ax can be performed, the NCCB indication information may be set to 0.

The second information is NCCB bandwidth information for one bandwidth of the first NCCB bandwidth and the second NCCB bandwidth that is to be used for transmitting the PPDU. If the second information is set to a first value, the bandwidth that is to be used for transmitting the data may be determined as the first NCCB. And, if the second information is set to a second value, the bandwidth that is to be used for transmitting the data may be determined as the second NCCB.

For example, if the NCCB bandwidth information is set to 2, the NCCB operation bandwidth may be determined as the 40 MHz or 60 MHz bandwidth (first NCCB bandwidth), wherein the NCCB is performed within the 80 MHz bandwidth. And, if the NCCB bandwidth information is set to 3, the NCCB operation bandwidth may be determined as the 80 MHz, 100 MHz, 120 MHz, or 140 MHz bandwidth (second NCCB bandwidth), wherein the NCCB is performed within the 160 MHz bandwidth.

The second signal field includes third information and fourth information.

The third information includes channel allocation information of the first NCCB bandwidth or the second NCCB bandwidth. The third information may be included in Resource Unit (RU) allocation information within a common field of the second signal field.

If the bandwidth that is to be used for transmitting the data is determined as the first NCCB, the third information may be configured as bit information of 01111y2y1y0 for the 80 MHz bandwidth. The bit information of 01111y2y1y0 may include channel allocation information of the 40 MHz or 60 MHz bandwidth. That is, among the 8 bits, a number of cases of NCCB within a maximum of eight 80 MHz bandwidths may be indicated through y2y1y0. Actually, since the number of cases of NCCB within the 80 MHz bandwidth is equal to 5, this may be sufficiently indicated through the bit information of 01111y2y1y0.

If the bandwidth that is to be used for transmitting the data is determined as the second NCCB, the third information may be configured as bit information of 111x4x3x2x1x0 per 80 MHz bandwidth for the 160 MHz bandwidth. The bit information of 111x4x3x2x1x0 may include channel allocation information per 80 MHz bandwidth of the 80 MHz, 100 MHz, 120 MHz, or 140 MHz bandwidth. That is, within the 160 MHz bandwidth, bits of x4x3x2x1x0 may be used for a first 80 MHz bandwidth, and bits of x4x3x2x1x0 may be used for a second 80 MHz bandwidth. Therefore, a number of cases of NCCB within the 160 MHz band of a total of 1024 cases (32*32) may be indicated. Actually, since the number of cases of NCCB within the 160 MHz bandwidth is equal to 64, this may be sufficiently indicated through the bit information of the two sets of 111x4x3x2x1x0.

The 01111y2y1y0 and the 111x4x3x2x1x0 may be included in the reserved bit of the RU allocation information.

The third information may further include allocation information for a null subcarrier, which is determined based on the RU allocation information. The null subcarrier that is included in the first NCCB bandwidth and the second NCCB bandwidth may be used for transmitting the data. This is because, when performing NCCB, the null subcarrier that is defined in the OFDMA RU allocation of 802.11ax is not needed to be used for the purpose of not transmitting data.

The fourth information includes a user field for each 20 MHz being included in the first NCCB bandwidth or the second NCCB bandwidth. At this point, the user field only includes an identifier of the one STA. Additionally, the user field may be identically configured for each 20 MHz bandwidth being included in the first NCCB bandwidth or the second NCCB bandwidth.

A user field corresponding to 20 MHz (or 242 RU), which may be viewed as a smallest RU unit, may exist in each NCCB bandwidth within the second signal field. However, since the 20 MHz bandwidths being included in the NCCB bandwidth are all allocated to one STA, STA_IDs being included in each user field are the same identifier of the one STA, and the remaining information may all be set (or configured) to have the same value.

Additionally, in order to perform the NCCB, the AP may transmit physical capability information to the one STA.

The physical capability information may include fifth information, sixth information, and seventh information.

The fifth information may be NCCB support information (NCCB support field) on whether or not the NCCB can be supported.

The sixth information may be Channel bandwidth information (Channel width set field) of continuous or non-continuous channels within a 2.4 GHz frequency and 5 GHz frequency. The Channel bandwidth information may also include channel bandwidths for the first NCCB bandwidth and the second NCCB bandwidth.

The seventh information may be information on 20 MHz band(s) being punctured (Punctured preamble RX field) within the 80 MHz bandwidth and the 160 MHz bandwidth. The first NCCB bandwidth and the second NCCB bandwidth may be generated excluding the punctured 20 MHz band(s).

According to the above-described method, wide bandwidth transmission of an STA may be easily performed by using NCCB, channel efficiency of a wireless LAN (WLAN) system may be increased, and throughput of the STA may be enhanced.

Figure 20:
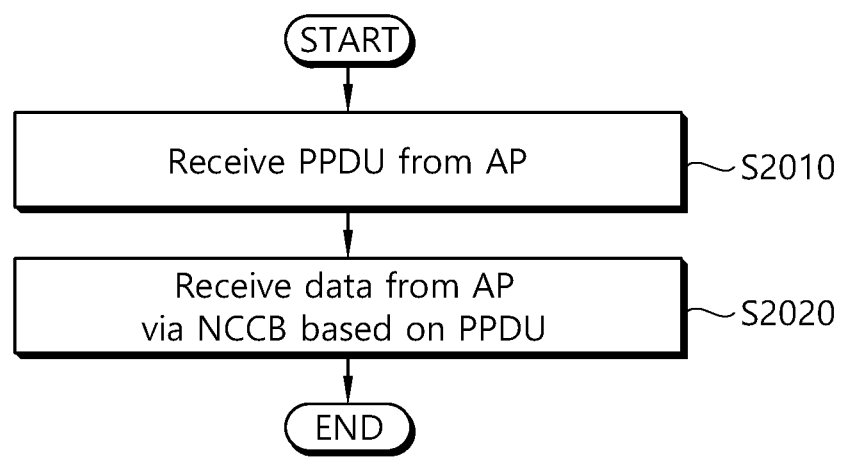
FIG. 20 is a flow chart illustrating a procedure for receiving data via NCCB by an STA according to an embodiment of the present disclosure.

FIG. 20 is a flow chart illustrating a procedure for receiving data via NCCB by an STA according to an embodiment of the present disclosure.

An example of FIG. 20 may be performed in a network environment supporting a next generation wireless LAN system. The next generation wireless LAN system is an improved wireless LAN system version of the 802.11ax system being capable of satisfying backward compatibility with the 802.11ax system.

Firstly, the terms will be defined. HE MU PPDU, HE-SIG-A field (first signal field), and HE-SIG-B field (second signal field) may all be PPDU and fields that are defined in the 802.11ax system. The PPDU and fields included in the PPDU that will hereinafter be described in detail may all be PPDU and fields being defined for performing NCCB in a next generation wireless LAN system. However, the PPDU and fields being defined for performing NCCB may be generated by using each subfield of the HE PPDU without any modification in order to satisfy backward compatibility with the 802.11ax system.

The example of FIG. 20 may be performed in a receiving device, and the receiving device may correspond to a station (STA) (i.e., non-AP STA) having NCCB capability. A transmitting device of FIG. 20 may correspond to an access point (AP).

In S2010, one station (STA) receives a Physical layer Protocol Data Unit (PPDU) from an access point (AP).

In S2020, the one STA receives data from the AP to through a first Non-Continuous Channel Bonding (NCCB) bandwidth or a second NCCB bandwidth based on the PPDU.

The PPDU is a PPDU being used for NCCB transmission, and, therefore, the PPDU may be an RTS frame, a trigger frame, an HE SU PPDU, or an HE MU PPDU. However, in the embodiment that will hereinafter be described in detail, the PPDU will be limited to an HE MU PPDU and described accordingly. In case the PPDU is an RTS frame, trigger frame, or HE SU PPDU, the PPDU may operate identically as the PPDU of the above-described embodiment. The RTS frame, trigger frame, HE SU PPDU, or HE MU PPDU may be modified or newly defined in a next generation wireless LAN (WLAN) system.

The PPDU includes a first signal field and a second signal field. As described above, the PPDU may be generated by using a High Efficiency Multi User PPDU (HE MU PPDU). The first signal field may be related to an HE-SIG-A field, which is included in the HE MU PPDU. And, the second signal field may be related to an HE-SIG-B field, which is included in the HE MU PPDU. Since the second signal field is included, it may be known that the PPDU is a PPDU format that is based on HE MU PPDU.

The first NCCB bandwidth is a 40 MHz or 60 MHz bandwidth, which is generated by bonding non-continuous 20 MHz bandwidths within an 80 MHz bandwidth. That is, in case a full (or total) bandwidth is 80 MHz, the first NCCB bandwidth may generate a 40 MHz bandwidth or a 60 MHz bandwidth by bonding non-continuous 20 MHz bandwidths. In case of generating a 60 MHz bandwidth, specific 20 MHz bandwidths may be adjacent to one another. In the 80 MHz bandwidth, the number of cases where 40 MHz and 60 MHz bandwidths are generated by using NCCB may be equal to a total of 5 cases.

The second NCCB bandwidth is an 80 MHz, 100 MHz, 120 MHz, or 140 MHz bandwidth, which is generated by bonding non-continuous 20 MHz bandwidths within a 160 MHz bandwidth. That is, in case a full (or total) bandwidth is 160 MHz, the second NCCB bandwidth may generate an 80 MHz, a 100 MHz bandwidth, a 120 MHz bandwidth, or a 140 MHz bandwidth by bonding non-continuous 20 MHz bandwidths. In the 160 MHz bandwidth, the number of cases where 80 MHz, 100 MHz, 120 MHz, and 140 MHz bandwidths are generated by using NCCB may be equal to a total of 64 cases.

The first signal field includes first information and second information.

The first information is NCCB indication information on whether or not NCCB can be performed. For example, if the NCCB transmission can be performed, the NCCB indication information may be set to 1, and, if simply an MU transmission of 802.11ax can be performed, the NCCB indication information may be set to 0.

The second information is NCCB bandwidth information for one bandwidth of the first NCCB bandwidth and the second NCCB bandwidth that is to be used for transmitting the PPDU. If the second information is set to a first value, the bandwidth that is to be used for transmitting the data may be determined as the first NCCB. And, if the second information is set to a second value, the bandwidth that is to be used for transmitting the data may be determined as the second NCCB.

For example, if the NCCB bandwidth information is set to 2, the NCCB operation bandwidth may be determined as the 40 MHz or 60 MHz bandwidth (first NCCB bandwidth), wherein the NCCB is performed within the 80 MHz bandwidth. And, if the NCCB bandwidth information is set to 3, the NCCB operation bandwidth may be determined as the 80 MHz, 100 MHz, 120 MHz, or 140 MHz bandwidth (second NCCB bandwidth), wherein the NCCB is performed within the 160 MHz bandwidth.

The second signal field includes third information and fourth information.

The third information includes channel allocation information of the first NCCB bandwidth or the second NCCB bandwidth. The third information may be included in Resource Unit (RU) allocation information within a common field of the second signal field.

If the bandwidth that is to be used for transmitting the data is determined as the first NCCB, the third information may be configured as bit information of $01111y2y1y0$ for the 80 MHz bandwidth. The bit information of $01111y2y1y0$ may include channel allocation information of the 40 MHz or 60 MHz bandwidth. That is, among the 8 bits, a number of cases of NCCB within a maximum of eight 80 MHz bandwidths may be indicated through $y2y1y0$. Actually, since the number of cases of NCCB within the 80 MHz bandwidth is equal to 5, this may be sufficiently indicated through the bit information of $01111y2y1y0$.

If the bandwidth that is to be used for transmitting the data is determined as the second NCCB, the third information may be configured as bit information of $111x4x3x2x1x0$ per 80 MHz bandwidth for the 160 MHz bandwidth. The bit information of 111x4x3x2x1x0 may include channel allocation information per 80 MHz bandwidth of the 80 MHz, 100 MHz, 120 MHz, or 140 MHz bandwidth. That is, within the 160 MHz bandwidth, bits of x4x3x2x1x0 may be used for a first 80 MHz bandwidth, and bits of x4x3x2x1x0 may be used for a second 80 MHz bandwidth. Therefore, a number of cases of NCCB within the 160 MHz band of a total of 1024 cases (32*32) may be indicated. Actually, since the number of cases of NCCB within the 160 MHz bandwidth is equal to 64, this may be sufficiently indicated through the bit information of the two sets of 111x4x3x2x1x0.

The 01111y2y1y0 and the 111x4x3x2x1x0 may be included in the reserved bit of the RU allocation information.

The third information may further include allocation information for a null subcarrier, which is determined based on the RU allocation information. The null subcarrier that is included in the first NCCB bandwidth and the second NCCB bandwidth may be used for transmitting the data. This is because, when performing NCCB, the null subcarrier that is defined in the OFDMA RU allocation of 802.11ax is not needed to be used for the purpose of not transmitting data.

The fourth information includes a user field for each 20 MHz being included in the first NCCB bandwidth or the second NCCB bandwidth. At this point, the user field only includes an identifier of the one STA. Additionally, the user field may be identically configured for each 20 MHz bandwidth being included in the first NCCB bandwidth or the second NCCB bandwidth.

A user field corresponding to 20 MHz (or 242 RU), which may be viewed as a smallest RU unit, may exist in each NCCB bandwidth within the second signal field. However, since the 20 MHz bandwidths being included in the NCCB bandwidth are all allocated to one STA, STA_IDs being included in each user field are the same identifier of the one STA, and the remaining information may all be set (or configured) to have the same value.

Additionally, in order to perform the NCCB, the AP may transmit physical capability information to the one STA.

The physical capability information may include fifth information, sixth information, and seventh information.

The fifth information may be NCCB support information (NCCB support field) on whether or not the NCCB can be supported.

The sixth information may be Channel bandwidth information (Channel width set field) of continuous or non-continuous channels within a 2.4 GHz frequency and 5 GHz frequency. The Channel bandwidth information may also include channel bandwidths for the first NCCB bandwidth and the second NCCB bandwidth.

The seventh information may be information on 20 MHz band(s) being punctured (Punctured preamble RX field) within the 80 MHz bandwidth and the 160 MHz bandwidth. The first NCCB bandwidth and the second NCCB bandwidth may be generated excluding the punctured 20 MHz band(s).

According to the above-described method, wide bandwidth transmission of an STA may be easily performed by using NCCB, channel efficiency of a wireless LAN (WLAN) system may be increased, and throughput of the STA may be enhanced.

3. Device Configuration

Figure 21:
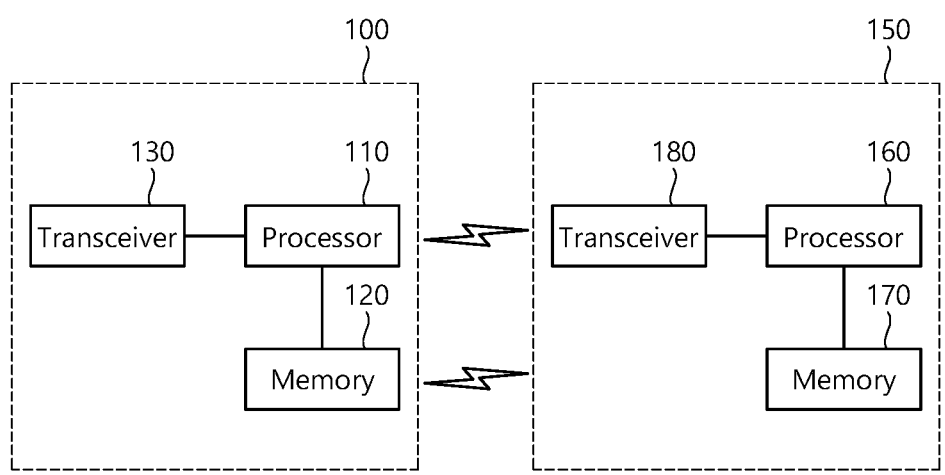
FIG. 21 is a diagram for describing a device for implementing the above-described method.

FIG. 21 is a diagram describing a device for implementing the above-described method.

A wireless device (100) of FIG. 21 may be a transmitting device, which transmits a signal that is described in the description presented above, and a wireless device (150) may be a receiving device, which receives a signal that is described in the description presented above.

The transmitting device (100) may include a processor (110), a memory (120), and a transceiver (130), and the receiving device (150) may include a processor (160), a memory (170), and a transceiver (180). The transceiver (130, 180) transmits/receives a radio signal and may be operated in a physical layer of IEEE 802.11/3GPP, and so on. The processor (110, 160) may be operated in the physical layer and/or MAC layer and may be operatively connected to the transmitting/receiving unit (130, 180).

The processor (110, 160) and/or the transceiver (130, 180) may include application-specific integrated circuit (ASIC), other chipset, logic circuit and/or data processor. The memory (120, 170) may include read-only memory (ROM), random access memory (RAM), flash memory, memory card, storage medium and/or other storage unit. When the embodiments are executed by software, the techniques (or methods) described herein can be executed with modules (e.g., processes, functions, and so on) that perform the functions described herein. The modules can be stored in the memory (120, 170) and executed by the processor (110, 160). The memory (120, 170) can be implemented (or positioned) within the processor (110, 160) or external to the processor (110, 160). Also, the memory (120, 170) may be operatively connected to the processor (110, 160) via various means known in the art.

The processor (110, 160) may implement the functions, processes and/or methods proposed in the present disclosure. For example, the processor (110, 160) may perform the operation according to the present embodiment.

Detailed operations of the processor (110) of the transmitting device are as follows. The processor (110) of the transmitting device generates and transmits a PPDU for NCCB, and the processor (110) transmits data to one STA via NCCB based on the PPDU.

Detailed operations of the processor (160) of the receiving device are as follows. The processor (160) of the receiving device receives a PPDU from an access point (AP), and the processor (160) receives and decodes data through the corresponding NCCB based on the PPDU.

Figure 22:
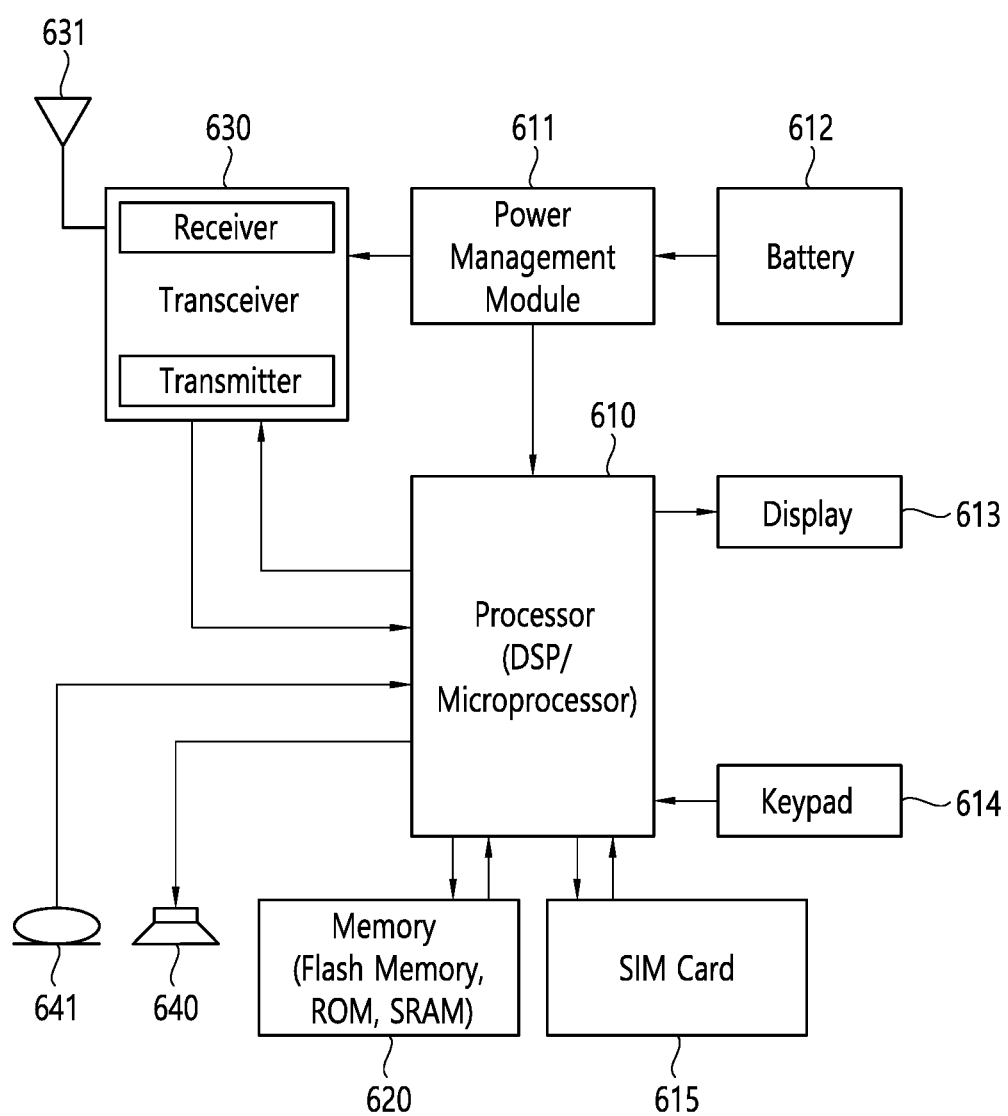
FIG. 22 illustrates a more detailed wireless device for implementing the embodiment of the present disclosure.

FIG. 22 illustrates a more detailed wireless device for implementing the embodiment of the present disclosure.

A wireless device includes a processor (610), a power management module (611), a battery (612), a display (613), a keypad (614), a subscriber identification module (SIM) card (615), a memory (620), a transceiver (630), one or more antennas (631), a speaker (640), and a microphone (641).

The processor (610) may be configured to implement proposed functions, procedures and/or methods of the present disclosure that are described below. Layers of the radio interface protocol may be implemented in the processor (610). The processor (610) may include application-specific integrated circuit (ASIC), other chipset, logic circuit and/or data processing device. The processor (610) may be an application processor (AP). The processor (610) may include at least one of a digital signal processor (DSP), a central processing unit (CPU), a graphics processing unit (GPU), a modem (modulator and demodulator). An example of the processor (610) may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The power management module (611) manages power for the processor (610) and/or the transceiver (630). The battery (612) supplies power to the power management module (611). The display (613) outputs results processed by the processor (610). The keypad (614) receives inputs to be used by the processor (610). The keypad (614) may be shown on the display (613). The SIM card (615) is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory (620) is operatively coupled with the processor (610) and stores a variety of information to operate the processor (610). The memory (620) may include read-only memory (ROM), random access memory (RAM), flash memory, memory card, storage medium and/or other storage device. When the embodiments are implemented in software, the techniques described herein may be implemented with modules (e.g., procedures, functions, and so on) that perform the functions described herein. The modules may be stored in the memory (620) and executed by the processor (610). The memory (620) may be implemented within the processor (610) or external to the processor (610) in which case those can be communicatively coupled to the processor (610) via various means as is known in the art.

The transceiver (630) is operatively coupled with the processor (610) and transmits and/or receives a radio signal. The transceiver (630) includes a transmitter and a receiver. The transceiver (630) may include baseband circuitry to process radio frequency signals. The transceiver (630) controls the one or more antennas (631) to transmit and/or receive a radio signal.

The speaker (640) outputs sound-related results processed by the processor (610). The microphone (641) receives sound-related inputs to be used by the processor (610).

In case of the transmitting device, the processor (610) generates and transmits a PPDU for NCCB, and the processor (610) transmits data to one STA via NCCB based on the PPDU.

In case of the receiving device, the processor (610) of the receiving device receives a PPDU from an access point (AP), and the processor (610) receives and decodes data through the corresponding NCCB based on the PPDU.

The PPDU is a PPDU being used for NCCB transmission, and, therefore, the PPDU may be an RTS frame, a trigger frame, an HE SU PPDU, or an HE MU PPDU. However, in the embodiment that will hereinafter be described in detail, the PPDU will be limited to an HE MU PPDU and described accordingly. In case the PPDU is an RTS frame, trigger frame, or HE SU PPDU, the PPDU may operate identically as the PPDU of the above-described embodiment. The RTS frame, trigger frame, HE SU PPDU, or HE MU PPDU may be modified or newly defined in a next generation wireless LAN (WLAN) system.

The PPDU includes a first signal field and a second signal field. As described above, the PPDU may be generated by using a High Efficiency Multi User PPDU (HE MU PPDU). The first signal field may be related to an HE-SIG-A field, which is included in the HE MU PPDU. And, the second signal field may be related to an HE-SIG-B field, which is included in the HE MU PPDU. Since the second signal field is included, it may be known that the PPDU is a PPDU format that is based on HE MU PPDU.

The first NCCB bandwidth is a 40 MHz or 60 MHz bandwidth, which is generated by bonding non-continuous 20 MHz bandwidths within an 80 MHz bandwidth. That is, in case a full (or total) bandwidth is 80 MHz, the first NCCB bandwidth may generate a 40 MHz bandwidth or a 60 MHz bandwidth by bonding non-continuous 20 MHz bandwidths. In case of generating a 60 MHz bandwidth, specific 20 MHz bandwidths may be adjacent to one another. In the 80 MHz bandwidth, the number of cases where 40 MHz and 60 MHz bandwidths are generated by using NCCB may be equal to a total of 5 cases.

The second NCCB bandwidth is an 80 MHz, 100 MHz, 120 MHz, or 140 MHz bandwidth, which is generated by bonding non-continuous 20 MHz bandwidths within a 160 MHz bandwidth. That is, in case a full (or total) bandwidth is 160 MHz, the second NCCB bandwidth may generate an 80 MHz, a 100 MHz bandwidth, a 120 MHz bandwidth, or a 140 MHz bandwidth by bonding non-continuous 20 MHz bandwidths. In the 160 MHz bandwidth, the number of cases where 80 MHz, 100 MHz, 120 MHz, and 140 MHz bandwidths are generated by using NCCB may be equal to a total of 64 cases.

The first signal field includes first information and second information.

The first information is NCCB indication information on whether or not NCCB can be performed. For example, if the NCCB transmission can be performed, the NCCB indication information may be set to 1, and, if simply an MU transmission of 802.11ax can be performed, the NCCB indication information may be set to 0.

The second information is NCCB bandwidth information for one bandwidth of the first NCCB bandwidth and the second NCCB bandwidth that is to be used for transmitting the PPDU. If the second information is set to a first value, the bandwidth that is to be used for transmitting the data may be determined as the first NCCB. And, if the second information is set to a second value, the bandwidth that is to be used for transmitting the data may be determined as the second NCCB.

For example, if the NCCB bandwidth information is set to 2, the NCCB operation bandwidth may be determined as the 40 MHz or 60 MHz bandwidth (first NCCB bandwidth), wherein the NCCB is performed within the 80 MHz bandwidth. And, if the NCCB bandwidth information is set to 3, the NCCB operation bandwidth may be determined as the 80 MHz, 100 MHz, 120 MHz, or 140 MHz bandwidth (second NCCB bandwidth), wherein the NCCB is performed within the 160 MHz bandwidth.

The second signal field includes third information and fourth information.

The third information includes channel allocation information of the first NCCB bandwidth or the second NCCB bandwidth. The third information may be included in Resource Unit (RU) allocation information within a common field of the second signal field.

If the bandwidth that is to be used for transmitting the data is determined as the first NCCB, the third information may be configured as bit information of 01111y2y1y0 for the 80 MHz bandwidth. The bit information of 01111y2y1y0 may include channel allocation information of the 40 MHz or 60 MHz bandwidth. That is, among the 8 bits, a number of cases of NCCB within a maximum of eight 80 MHz bandwidths may be indicated through y2y1y0. Actually, since the number of cases of NCCB within the 80 MHz bandwidth is equal to 5, this may be sufficiently indicated through the bit information of 01111y2y1y0.

If the bandwidth that is to be used for transmitting the data is determined as the second NCCB, the third information may be configured as bit information of 111x4x3x2x1x0 per 80 MHz bandwidth for the 160 MHz bandwidth. The bit information of 111x4x3x2x1x0 may include channel allocation information per 80 MHz bandwidth of the 80 MHz, 100 MHz, 120 MHz, or 140 MHz bandwidth. That is, within the 160 MHz bandwidth, bits of x4x3x2x1x0 may be used for a first 80 MHz bandwidth, and bits of x4x3x2x1x0 may be used for a second 80 MHz bandwidth. Therefore, a number of cases of NCCB within the 160 MHz band of a total of 1024 cases (32*32) may be indicated. Actually, since the number of cases of NCCB within the 160 MHz bandwidth is equal to 64, this may be sufficiently indicated through the bit information of the two sets of 111x4x3x2x1x0.

The 01111y2y1y0 and the 111x4x3x2x1x0 may be included in the reserved bit of the RU allocation information.

The third information may further include allocation information for a null subcarrier, which is determined based on the RU allocation information. The null subcarrier that is included in the first NCCB bandwidth and the second NCCB bandwidth may be used for transmitting the data. This is because, when performing NCCB, the null subcarrier that is defined in the OFDMA RU allocation of 802.11ax is not needed to be used for the purpose of not transmitting data.

The fourth information includes a user field for each 20 MHz being included in the first NCCB bandwidth or the second NCCB bandwidth. At this point, the user field only includes an identifier of the one STA. Additionally, the user field may be identically configured for each 20 MHz bandwidth being included in the first NCCB bandwidth or the second NCCB bandwidth.

A user field corresponding to 20 MHz (or 242 RU), which may be viewed as a smallest RU unit, may exist in each NCCB bandwidth within the second signal field. However, since the 20 MHz bandwidths being included in the NCCB bandwidth are all allocated to one STA, STA_IDs being included in each user field are the same identifier of the one STA, and the remaining information may all be set (or configured) to have the same value.

Additionally, in order to perform the NCCB, the AP may transmit physical capability information to the one STA.

The physical capability information may include fifth information, sixth information, and seventh information.

The fifth information may be NCCB support information (NCCB support field) on whether or not the NCCB can be supported.

The sixth information may be Channel bandwidth information (Channel width set field) of continuous or non-continuous channels within a 2.4 GHz frequency and 5 GHz frequency. The Channel bandwidth information may also include channel bandwidths for the first NCCB bandwidth and the second NCCB bandwidth.

The seventh information may be information on 20 MHz band(s) being punctured (Punctured preamble RX field) within the 80 MHz bandwidth and the 160 MHz bandwidth. The first NCCB bandwidth and the second NCCB bandwidth may be generated excluding the punctured 20 MHz band(s).

According to the above-described method, wide bandwidth transmission of an STA may be easily performed by using NCCB, channel efficiency of a wireless LAN (WLAN) system may be increased, and throughput of the STA may be enhanced.

What is claimed is:

1. A method for transmitting data in a wireless LAN system, the method comprising:
   transmitting, by an access point (AP), a Physical layer Protocol Data Unit (PPDU) to one station (STA); and
   transmitting, by the AP, data to the one STA through a first Non-Continuous Channel Bonding (NCCB) bandwidth or a second NCCB bandwidth based on the PPDU,
   wherein the PPDU includes a first signal field and a second signal field,
   wherein the first NCCB bandwidth is a 40 MHz or 60 MHz bandwidth being generated by bonding non-continuous 20 MHz bandwidths within an 80 MHz bandwidth,
   wherein the second NCCB bandwidth is an 80 MHz, 100 MHz, 120 MHz, or 140 MHz bandwidth being generated by bonding non-continuous 20 MHz bandwidths within a 160 MHz bandwidth,
   wherein the first signal field includes first information and second information,
   wherein the first information is NCCB indication information on whether or not NCCB can be performed,
   wherein the second information is NCCB bandwidth information for one bandwidth of the first NCCB bandwidth and the second NCCB bandwidth that is to be used for transmitting the PPDU,
   wherein the second signal field includes third information and fourth information,
   wherein the third information includes channel allocation information of the first NCCB bandwidth or the second NCCB bandwidth,
   wherein the fourth information includes a user field for each 20 MHz being included in the first NCCB bandwidth or the second NCCB bandwidth,
   wherein the user field only includes an identifier of the one STA,
   wherein, if the second information is set to a first value, the bandwidth that is to be used for transmitting the data is determined as the first NCCB,
   wherein, if the second information is set to a second value, the bandwidth that is to be used for transmitting the data is determined as the second NCCB,
   wherein the third information is included in Resource Unit (RU) allocation information within a common field of the second signal field,
   wherein, if the bandwidth that is to be used for transmitting the data is determined as the first NCCB, the third information is configured as bit information of 01111y2y1y0 for the 80 MHz bandwidth,
   wherein the bit information of 01111y2y1y0 includes channel allocation information of the 40 MHz or 60 MHz bandwidth,
   wherein if the bandwidth that is to be used for transmitting the data is determined as the second NCCB, the third information is configured as bit information of 111x4x3x2x1x0 per 80 MHz bandwidth for the 160 MHz bandwidth, and
   wherein the bit information of 111x4x3x2x1x0 includes channel allocation information per 80 MHz bandwidth of the 80 MHz, 100 MHz, 120 MHz, or 140 MHz bandwidth.

2. The method of claim 1, wherein the 01111y2y1y0 and the 111x4x3x2x1x0 are included in a reserved bit of the RU allocation information.

3. The method of claim 1, wherein the third information further includes allocation information for a null subcarrier, the null subcarrier being determined based on the RU allocation information, and wherein the null subcarrier being included in the first NCCB bandwidth and the second NCCB bandwidth is used for transmitting the data.

4. The method of claim 1, wherein the user field is identically configured for each 20 MHz bandwidth being included in the first NCCB bandwidth or the second NCCB bandwidth.

5. The method of claim 1, further comprising:
transmitting, by the AP, physical capability information to the one STA in order to perform the NCCB,
wherein the physical capability information includes fifth information, sixth information, and seventh information,
wherein the fifth information is NCCB support information on whether or not the NCCB can be supported,
wherein the sixth information is Channel bandwidth information of continuous or non-continuous channels within a 2.4 GHz frequency and 5 GHz frequency,
wherein the seventh information is information on 20 MHz band being punctured within the 80 MHz bandwidth and the 160 MHz bandwidth, and
wherein the first NCCB bandwidth and the second NCCB bandwidth is generated excluding the punctured 20 MHz band.

6. The method of claim 1, wherein the PPDU is generated by using a High Efficiency Multi User PPDU (HE MU PPDU),
wherein the first signal field is related to an HE-SIG-A field being included in the HE MU PPDU, and
wherein the second signal field is related to an HE-SIG-B field being included in the HE MU PPDU.

7. A wireless device being an access point (AP) for transmitting data in a wireless LAN system, the wireless device comprising:
a memory;
a transceiver; and
a processor being operatively coupled with the memory and the transceiver,
wherein the processor:
transmits a Physical layer Protocol Data Unit (PPDU) to one station (STA), and
transmits data to the one STA through a first Non-Continuous Channel Bonding (NCCB) bandwidth or a second NCCB bandwidth based on the PPDU,
wherein the PPDU includes a first signal field and a second signal field,
wherein the first NCCB bandwidth is a 40 MHz or 60 MHz bandwidth being generated by bonding non-continuous 20 MHz bandwidths within an 80 MHz bandwidth,
wherein the second NCCB bandwidth is an 80 MHz, 100 MHz, 120 MHz, or 140 MHz bandwidth being generated by bonding non-continuous 20 MHz bandwidths within a 160 MHz bandwidth,
wherein the first signal field includes first information and second information,
wherein the first information is NCCB indication information on whether or not NCCB can be performed,
wherein the second information is NCCB bandwidth information for one bandwidth of the first NCCB bandwidth and the second NCCB bandwidth that is to be used for transmitting the PPDU,
wherein the second signal field includes third information and fourth information,
wherein the third information includes channel allocation information of the first NCCB bandwidth or the second NCCB bandwidth,
wherein the fourth information includes a user field for each 20 MHz being included in the first NCCB bandwidth or the second NCCB bandwidth,
wherein the user field only includes an identifier of the one STA,
wherein, if the second information is set to a first value, the bandwidth that is to be used for transmitting the data is determined as the first NCCB,
wherein, if the second information is set to a second value, the bandwidth that is to be used for transmitting the data is determined as the second NCCB,
wherein the third information is included in Resource Unit (RU) allocation information within a common field of the second signal field,
wherein, if the bandwidth that is to be used for transmitting the data is determined as the first NCCB, the third information is configured as bit information of 01111y2y1y0 for the 80 MHz bandwidth,
wherein the bit information of 01111y2y1y0 includes channel allocation information of the 40 MHz or 60 MHz bandwidth,
wherein if the bandwidth that is to be used for transmitting the data is determined as the second NCCB, the third information is configured as bit information of 111x4x3x2x1x0 per 80 MHz bandwidth for the 160 MHz bandwidth, and
wherein the bit information of 111x4x3x2x1x0 includes channel allocation information per 80 MHz bandwidth of the 80 MHz, 100 MHz, 120 MHz, or 140 MHz bandwidth.

8. The wireless device of claim 7, wherein the 01111y2y1y0 and the 111x4x3x2x1x0 are included in a reserved bit of the RU allocation information.

9. The wireless device of claim 7, wherein the third information further includes allocation information for a null subcarrier, the null subcarrier being determined based on the RU allocation information, and
wherein the null subcarrier being included in the first NCCB bandwidth and the second NCCB bandwidth is used for transmitting the data.

10. The wireless device of claim 7, the user field is identically configured for each 20 MHz bandwidth being included in the first NCCB bandwidth or the second NCCB bandwidth.

11. A method for receiving data in a wireless LAN system, the method comprising:
receiving, by one station (STA), a Physical layer Protocol Data Unit (PPDU) from an access point (AP); and
receiving, by the one STA, data from the AP through a first Non-Continuous Channel Bonding (NCCB) bandwidth or a second NCCB bandwidth based on the PPDU,
wherein the PPDU includes a first signal field and a second signal field,
wherein the first NCCB bandwidth is a 40 MHz or 60 MHz bandwidth being generated by bonding non-continuous 20 MHz bandwidths within an 80 MHz bandwidth,
wherein the second NCCB bandwidth is an 80 MHz, 100 MHz, 120 MHz, or 140 MHz bandwidth being generated by bonding non-continuous 20 MHz bandwidths within a 160 MHz bandwidth,
wherein the first signal field includes first information and second information,
wherein the first information is NCCB indication information on whether or not NCCB can be performed, wherein the second information is NCCB bandwidth information for one bandwidth of the first NCCB bandwidth and the second NCCB bandwidth that is to be used for transmitting the PPDU, wherein the second signal field includes third information and fourth information, wherein the third information includes channel allocation information of the first NCCB bandwidth or the second NCCB bandwidth, wherein the fourth information includes a user field for each 20 MHz being included in the first NCCB bandwidth or the second NCCB bandwidth, wherein the user field only includes an identifier of the one STA, wherein, if the second information is set to a first value, the bandwidth that is to be used for transmitting the data is determined as the first NCCB, wherein, if the second information is set to a second value, the bandwidth that is to be used for transmitting the data is determined as the second NCCB, wherein the third information is included in Resource Unit (RU) allocation information within a common field of the second signal field, wherein, if the bandwidth that is to be used for transmitting the data is determined as the first NCCB, the third information is configured as bit information of 01111y2y1y0 for the 80 MHz bandwidth, wherein the bit information of 01111y2y1y0 includes channel allocation information of the 40 MHz or 60 MHz bandwidth, wherein if the bandwidth that is to be used for transmitting the data is determined as the second NCCB, the third information is configured as bit information of 111x4x3x2x1x0 per 80 MHz bandwidth for the 160 MHz bandwidth, and wherein the bit information of 111x4x3x2x1x0 includes channel allocation information per 80 MHz bandwidth of the 80 MHz, 100 MHz, 120 MHz, or 140 MHz bandwidth.

* * * * *